United States Patent [19]
Perlin et al.

[11] Patent Number: 5,341,466
[45] Date of Patent: Aug. 23, 1994

[54] FRACTAL COMPUTER USER CENTERFACE WITH ZOOMING CAPABILITY

[75] Inventors: Kenneth Perlin; Jacob Schwartz, both of New York, N.Y.

[73] Assignee: New York University, New York, N.Y.

[21] Appl. No.: 698,016

[22] Filed: May 9, 1991

[51] Int. Cl.$^5$ .............................................. G06F 15/62
[52] U.S. Cl. .................................. 395/139; 395/128; 395/145; 395/157; 382/47
[58] Field of Search ............... 395/145, 128, 139, 157, 395/158, 159, 155; 382/47, 56

[56] References Cited

U.S. PATENT DOCUMENTS

| | | | |
|---|---|---|---|
| Re. 33,316 | 8/1990 | Katsuta et al. | 364/521 |
| 4,622,632 | 11/1986 | Tanimoto et al. | 364/200 |
| 4,694,407 | 9/1987 | Ogden | 364/518 |
| 4,800,510 | 1/1989 | Vinberg et al. | 364/521 |
| 4,821,211 | 4/1989 | Torres | 364/521 |
| 4,823,303 | 4/1989 | Terasawa | 364/521 |
| 4,843,538 | 6/1989 | Lane et al. | 364/188 |
| 4,862,390 | 8/1989 | Weiner | 364/521 |
| 4,868,765 | 9/1989 | Diefendorff | 364/521 |
| 4,874,164 | 10/1989 | Miner et al. | 273/1 |
| 4,884,199 | 11/1989 | Boothroyd et al. | 364/408 |
| 4,885,704 | 12/1989 | Takagi et al. | 364/521 |
| 4,899,292 | 2/1990 | Montagna et al. | 364/521 |
| 4,931,954 | 6/1990 | Honda et al. | 364/518 |
| 4,931,956 | 6/1990 | Stapleton | 364/521 |
| 4,996,652 | 2/1991 | Morita et al. | 364/521 |
| 5,051,927 | 9/1991 | Tada et al. | 364/521 |

OTHER PUBLICATIONS

Bolt, Dr. R. A., "Spatial Data-Management," MIT (1979).
Donelson, W. C. et al., "Spatial Managment of Information" Quarterly Report of Siggraph-ACM Siggraph (1978).
Herot, F. et al., "A Prototype Spatial Data Management System" Quarterly Report of Siggraph-ACM (Jul. 14, 1980).
Bolt, R. A. "The Human Interface" *Lifetime Learning Publications,* (1984).
Negroponte, N. "Books without Pages," IEEE Conference Proceedings (Jul., 1979).
Tanimoto, S. and Pavlidis, T., "A Hierarchial Data Structure for Picture Processing," *Computer Graphics and Image Processing,* 4, 104–119 (1975).
L. Williams, "Pyramidal Parametrics," *Computer Graphics,* vol. 17, No. 3 (Jul. 1983).
L. Uhr, "Layered 'Recognition Cone' Networks that Preprocess, Classify, and Describe," *IEEE Transactions on Computers,* Jul. 1972.

*Primary Examiner*—Heather R. Herndon
*Assistant Examiner*—Joseph Feild

[57] ABSTRACT

A computer user interface that represents information stored in a computer as reprentation objects located on at least one reference surface is disclosed. A user can magnify or reduce the displayed information by "zooming" in or out. The magnification operation displays a smaller portion of a particular surface, but each object that remains in view is displayed in greater size and/or detail. Similarly, the reduction operation displays a larger portion of a given surface, but each object within such surface is displayed in a smaller size and/or less detail. In order to view one part of the surface from another part of the surface or from another surface, a special type of an object, called a representation portal object, is provided. A graphical description of each object is physically stored in computer memory essentially as a sequence of compressed image representations. The first image in the sequence is a bit-mapped representation of an object as it was created, and each subsequent image is a reduced copy of the first image.

30 Claims, 19 Drawing Sheets

FIG. 3

FRACTAL COMPUTER USER CENTERFACE WITH ZOOMING CAPABILITY

FIELD OF THE INVENTION

This invention relates to a method and apparatus for presenting information to users of computer systems. More specifically, this invention relates to a new computer user interface that provides multiple levels of magnification of displayed information in real time on a general purpose computer.

BACKGROUND OF THE INVENTION

As more advanced computer systems make it possible to work with very complex information collections and control options, limited display screen area becomes increasingly inadequate for presenting this information to users.

Modern systems attempt to provide various solutions to this problem. For example, windowing systems divide a computer screen into multiple areas displayed in tiled or overlapping arrangements resembling arrangements of sheets of paper of various sizes on a desktop. Since at least a small part of each window is not hidden by other windows that appear to lie on top of it, a computer user is reminded of the information displayed on the background windows, and he/she can access this information by bringing a background window to the foreground by positioning a cursor on any unobscured point in the desired window and then selecting the window by means of a peripheral device, such as a mouse. Although this method increases the amount of data which is readily available to a user, only a limited number of windows can be open simultaneously. Furthermore, the current windowing style forces one, so to speak, to 'live out of boxes', since the objects that one needs to access are concealed until the logical 'boxes', which contain these objects, are explicitly opened. This deprives a system user of the equivalent of 'peripheral vision', which plays an essential role in daily life.

A commonly employed method of exposing a user to a variety of control functions is by using a menu. A menu presents a user with an array of symbolically represented choices. Usually, when a user selects one of the choices, a list of subsidiary choices is displayed. These secondary choices may, in turn, cause the display of another level of menu choices, so that a sequence of choices of any depth can be provided for a complex computer application. Typically, menus of low level choices are displayed only when mutually dependent successive higher level choices are made. Since all the choices are displayed in identical or comparable size, they take up substantial screen areas and, therefore, these displays of choices are removed once a complete sequence of choices has been made, thereby depriving a system user of any continuing reminder of how a similar sequence of choices can be made again.

Another technique for displaying menus of command options is to continuously present a panel of choices in a designated screen area. To access additional options, a user can interactively replace a currently displayed panel by the next one in sequence. By constantly changing the menus displayed on the screen, a user is frequently confused about the location and availability of a desired operation. In addition, the compressed representations of options used to save display space are often hard to understand, devoid of immediately available documentation, and bewildering to all but the most experienced system users.

Often, a computer requests a user to supply information that goes beyond a simple functional selection. For example, a user may have to supply the name of a file or the value of a numerical parameter. Where a response to a computer generated inquiry is required, a common practice is to display a rectangular 'dialogue box' where a user can type in the required input. Because the dialogue box area obscures part of the display area, a user must remove the dialogue box area from the screen by explicitly "closing" it after the required information is entered. Those repeated open/close operations are visually jarring and time-consuming.

Typically, text and graphical files are displayed by "scrolling" the display area, i.e. moving the displayed material "left/right" or "up/down" until a desired line of text or a graphical detail comes into view. A difficulty with this technique is that the number of items that can be displayed simultaneously is severely limited. Since items that are not scrolled into the field of view are entirely invisible, a user, searching for a particular item in a lengthy file, may easily become confused about the direction of the scroll, even when the desired item is only a single line away from the visible portion of the file. The uncertainty that results from the traditional scroll reduces working efficiency of the users of computer systems.

A user of a computer system frequently deals with hierarchical information structures that are organized as a decision tree. As indicated, a typical menu driven system that provides a wide variety of capabilities necessarily includes several levels of menus. Since menu options at the top level do not suggest the options at the low levels, a user needs extensive training to use such systems, or he has to continuously refer to the manuals. Another example of a hierarchical information structure is a directory of files provided by a typical operating system. It usually contains a root directory, which contains files and/or pointers to sub-directories, and each sub-directory also contains files and/or pointers to lower-level sub-directories. Usually, thousands of files can be stored in this fashion. Thus, to access a desired file, a user has to travel up and down through levels of sub-directories relatively blindly. To guide a user who navigates from one menu or sub-directory to another, hierarchical structures can be represented graphically, as a tree. However, such interfaces are still confusing because for a large hierarchy, a graphical representation occupies multiple display screens. The directories, menus, and scrollable displays are even less adequate for presenting diversified data collections that cannot be easily described by a well structured hierarchy.

The computer science community realized that the restricted size of the computer screen detracted from efficient utilization of computers. Several attempts have been made to address this problem by changing the working environment of a computer system user. See A. Bolt, "Spatial Data-Management", MIT, 1979. The researchers at MIT attempted to improve efficiency of user access to information by developing a media room which comprises a wall-sized display screen, two small television monitors, eight loudspeakers, two "joysticks," and two touch-sensitive pads. In the "Data Management" system disclosed in the Bolt article, all the data available to a user is arranged on a single plane, which is displayed in its entirety on the television monitors. Additionally, a smaller portion of the same plane is displayed on the large display screen. The portion of information displayed on the large screen is indicated by a rectangle on the television screen. A user thus has the capability of displaying different portions of the single information plane at several different sizes on the large screen.

The Bolt paper does not teach a commercially useful computer user-interface which can be employed by a wide variety of systems and applications. Although a zooming capability for data management is proposed, the Bolt paper does not address the issue of providing such a capability efficiently using a generic workstation rather than a complicated collection of equipment. Furthermore, for efficient commercial use, an application independent interface is required. However, it can be inferred from the discussion in Bolt that, in order to employ the capabilities provided by the system, the applications have to be implemented specifically for the Data-Management system. Furthermore, the Data-Management system provides an interface for accessing information, but it does not appear to provide an interface for interactive entry and edit of new data. Also, the Data-Management system cannot be used to replace conventional menus, text editors, and other commercially available user interfaces, which use general purpose terminals as a display medium.

Currently available interfaces, which often fail to adequately present to a user commands and information provided by a computer system, do not address the inherent limitation of restricted computer screen size. These interfaces substantially limit the productivity of system users by forcing them into repeated and time-consuming searches of options, menus and the like. Furthermore, the searches are frequently performed without sufficient computer guidance, since not enough information can be accommodated on a limited screen area, and since the information appears and disappears with distracting suddenness. Since the variety and amount of information and control options available to users of computer systems is steadily and rapidly increasing, the limitations of the existing user interfaces will form an increasingly serious impediment to effective system use.

SUMMARY OF THE INVENTION

A new computer user interface of this invention (hereinafter called a "fractal interface") provides for rapid access to information stored in computer memory and efficient utilization of control functions. The fractal interface represents items of information stored in computerized form as a collection of representation objects of displayable information located on one or a plurality of reference surfaces. (A reference surface hereinafter is referred to as "surface" and a representation object hereinafter is referred to as "object"). A user can magnify or reduce the displayed information by zooming in or out. The magnification operation displays a smaller portion of a particular surface, but each object that remains in view is displayed in greater size and/or detail. Additionally, certain objects that are not visible at all at a given level of zoom may be made sufficiently visible after the magnification operation is performed. Similarly, the reduction operation displays a larger portion of a given surface, but each object within such surface is displayed in a smaller size and/or less detail and certain objects may disappear from a current view if the reduction changes their size to less than one pixel. Also, a user is provided with a pan capability for displaying a different portion of a given surface within the display area, and a capability of changing the size and location of individual objects.

According to this invention, the number of surfaces and the number of objects that can be located on each surface is limited only by the characteristics of a particular computer system or a particular application that utilizes the fractal interface. Also, zoom to any practical level of detail is possible. That is, the scale at which a particular surface is being viewed can be doubled, halved, or changed in any practical ratio. Since any portion of the display area can be enlarged, or reduced any practical number of times, any portion, no matter how small it appears when viewed at a given level of zoom, can be used to hold a very large amount of information, which becomes visible when the viewing scale is sufficiently enlarged. Furthermore, at any level of zoom, the extent of each surface is both "left/right" and "up/down" directions is limited only by the properties of the computer system and the application which utilizes the fractal interface capabilities.

As indicated, the fractal interface represents application data as objects located on one or a plurality of surfaces. In order to view one part of the surface from another part of the surface or from another surface, a special type of an object, called a representation portal object, is provided. Hereinafter, the representation portal object is referred to as a portal and, unless the distinction between objects and portals is necessary in a specific context, both objects and portals are referred to as objects. A portal is a transparent window into any portion of any surface. The interface is organized such that at least one portal corresponds to the display area surface. This display area portal (hereinafter called a "screen portal") may contain other portals, which may "look onto" other surfaces or portions of the same surface, which may also contain a plurality of portals.

The capabilities of the fractal interface can be employed to remove many limitations of currently available interfaces and to provide a computer user with highly intuitive and extremely convenient system for accessing information. The fractal interface is adaptable to interfacing with any type of information stored in a computer including, but not limited to, data bases, images, and documents. Since the interface can be implemented as an asynchronous computer process communicating with applications by inter-process message passing or as a library of functions that can be invoked by applications, it can be readily adapted for a variety of applications by application developers. Examples of several applications of the fractal interface are provided below.

To represent a large hierarchy of data or commands, the information can be displayed in a variety of sizes, such that key items are displayed in relatively large sizes, while subsidiary items are displayed in relatively small sizes. Using this interface, a user can perform rapid searches for key items over the broad areas of a particular surface, which contains the hierarchical information, while still being reminded of the presence of multiple layers of lower level items of the hierarchy located in the vicinity of the logically related higher-level items. Although for a large structure, the low levels of a hierarchy may appear so small that they are practically unreadable, a user can readily comprehend the topology of the entire structure and he/she can easily predict where a desired item of information is located. Then, a user can magnify the portion of the structure in which he/she expects to find the desired item. If information is not found at the predicted location, a user can zoom out and view the entire structure or a portion thereof, and then select another possible location of the desired object. In contrast to the traditional use of menus or directories, which conceals subsidiary information levels until they are explicitly accessed, this approach permits a natural decision making process through an easy and intuitive sequence of zooms. Since the interface of the invention can be used with a variety of applications running on most of the conventional computer systems, many commercial computer products may be developed with the integrated functionality of the fractal interface.

Accordingly, traditional menus can be replaced by menus where subsidiary levels of choices are displayed in the immediate vicinity of the high-level menu headings. The low-level choices are initially displayed in reduced form, but they can be easily accessed by zooming. In contrast to conventional menus, the present invention continuously presents to a user the available information and how to access it. In addition, reduced pages of documentation that describe various menu options can be displayed in the immediate vicinity of the corresponding selection keys. The documentation can be accessed by zooming precisely at the moment when it is likely to be needed.

The technique of cyclic re-use of screen areas can be replaced by a display area which simultaneously displays all the panels in miniature size, so that all the available options can be perceived simultaneously and any subgroup can be chosen for closer inspection and use by zooming down to it. Compressed representations of choices that are designed to save space in conventional menu systems can be replaced by more extensive and self-explanatory captions that initially appear in reduced size and, upon zooming, can be expanded to easily readable size and also to reveal the presence of attached documentation.

The conventional 'dialogue boxes' can be replaced by miniature displays that are always present near the menu options that require data input. These miniature 'dialogue boxes' can simply be left open at all times and can be enlarged for use by zooming. Also, it is possible to display a series of miniature boxes containing some of the previously supplied inputs. Since prior inputs very often set the pattern for subsequent inputs, this technique provides a capability for re-using previous inputs, thus substantially increasing the efficiency of system use.

The fractal interface can be employed such that it is practically unnecessary to remove information from the display area until the displayed information exceeds the storage capacity of the system. Instead of erasing old displays, a computer system can simply reduce them progressively in size, thus allowing a user free access to all this information through an easy and intuitive sequence of zooms. This technique facilitates efficient re-use of previously prepared materials, and also permits the entire history of development in a particular context to be easily recovered for subsequent reference.

Scrollable text employed in conventional interfaces can be replaced by a new type of scroll in which the text does not move completely out of view. Instead, it is reduced progressively in size while held in view. For example, in its central portion, a fractal scrolling window can show a portion of text displayed in a convenient size for editing, while showing the adjacent information at half size, and also showing as much as possible of the remainder of the information at a size at least sufficient to reveal the overall structure, such as paragraphing. Therefore, a user is continuously aware of his/her position in the overall document, and he/she can locate and move the desired portions of a displayed file efficiently. Similarly, during string searching, which is a common text editing capability, the located target strings of a search can be highlighted to indicate their location in the document. This can speed up the rate at which a user is able to pinpoint the desired strings, even if the document is shown in reduced form.

In many computer applications, it is desirable to keep certain key information items of particular importance constantly available. For example, the most recently employed commands should remain rapidly accessible, since these items are particularly likely to be used again. Similarly, certain software tools are frequently used by most of the users. Current computer technology does not adequately address this problem because the display area is continuously erased in order to display new data. This forces a user to repeatedly reconstruct needed items of information thereby substantially degrading his/her working efficiency. The fractal interface allows multiple common-use operations and data objects to be kept at hand constantly because, as indicated, in the fractal display environment it is possible to keep the previously used information in the display area by reducing the size of the previously displayed items.

According to the present invention, all the objects are represented by data objects that are organized in a data structure and physically stored in memory. Hereinafter, the physical storage provided for an object or a portal is referred to as data object; however, if it is necessary in a specific context to refer specifically to the storage provided for a portal, such storage is referred to as portal data object. In this embodiment, this data structure is organized as a linked list, in which each record of the linked list contains pointers to other records that define each data object. Note that a collection of data utilized for a particular purpose, physically stored in the memory of the computer as part of the data structure of the interface, is referred to as a record. The most important information stored for each object, as a corresponding data object, is its graphical representation and its address.

In the preferred embodiment, a graphical description of each object is physically stored in computer memory essentially as a seqnuce of compressed image representations. Hereinafter, the image representation is referred to as an "image". The sequence of compressed images is a part of data object. The compression format of the images is specifically designed for a real time display on a general purpose terminal; however, different encoding schemes can be employed in different embodiments of the invention.

As indicated, the graphical representation of each object of the preferred embodiment is stored as a sequence of compressed images (the compressed images are also referred to herein as "pixlists"). The first image in the sequence is a bit-mapped representation of an object as it was created, and each subsequent image is formed by replacing a $2 \times 2$ square of pixels of the previous image with one pixel. This sequence terminates when image resolution drops to one pixel. Since the number of images in this sequence is bounded by $\log_4$ of the number of pixels in the original image, the sequence is always relatively short. This data structure facilitates a real-time reduction of an object, since advantageously, the representations of an image reduced by a power of two are readily available. To reduce an image by a ratio other than a power of two, the closest pixlist larger than the desired representation is selected and then further reduced to the desired size by omitting the appropriate scan lines and bits within scan lines.

The fractal interface also provides a convenient way of magnifying images in real time by turning each pixel of the first (largest) image in the sequence into a square of the size proportional to the level of magnification. For example, to double the x and y dimensions of an image, the system converts each pixel to a 2×2 square of identical pixels, so that the number of pixels in the new image is four times the number of pixels in the original image. To further improve efficiency, for levels of magnification between 1 and 16 the system contains a table in which precomputed enlarged bytes of data are stored. Each byte represents eight contiguous pixels of a scan line. Thus, given a byte of a stored image of an object, the system can retrieve a string of bytes that represents a proper magnification of a given byte.

The sequences of images of different resolution that represent the same view have been utilized in computer technology for applications unrelated to user interfaces. For example, U.S. Pat. No. 4,622,632 to Tanimoto discloses a multi-processing system for processing of visual images each of which is arranged as a "pyramidal" data structure, that contains images with different degree of resolution. The Tanimoto patent enumerates the applications where such data structures have been found useful: "[s]uch a pyramid data structure finds application in many areas including edge detection, hierarchical searching, region growing, statistical classification, and computer graphics." Also, such pyramidal data structures of images with different resolution have been employed for simulating three-dimensional representation of textures. See Williams, "Pyramidal Parametrics," Computer Graphics, Vol. 17, No. 3, July 1983 which addressed generating (but not interacting with) three dimensional pictures using a computer. However, the art does not teach that image pyramids can be applicable to real-time interactive user interfaces, such as the interface of the present invention.

In addition to a sequence of images stored as part of the data object for graphically representing each object, an address record is stored for each object as part of the corresponding data object. The address record is used for proper display of relative positions and scales of the objects and for interactive identification of the displayed objects.

More specifically, the address record of each data object represents the scale and location of the object with respect to the surface where the object resides. There is a two-dimensional coordinate system defined for each surface, and the coordinates of each point on the surface can be expressed in terms of arbitrarily defined surface units. The address record of each data object consists of four parameters [x, y, z, surface], wherein the "x" and "y" coordinates are coordinates of the object with respect to the surface coordinate system expressed in surface units, the "z" coordinate is the number of surface units covered by each pixel of the object, and the "surface" is an identifier of the surface where the object resides. Thus, changing the x coordinate of an object moves an object horizontally on its surface; changing the y coordinate moves an object vertically on the surface; doubling the z coordinate, doubles the object's scale; changing the value of "surface" removes the object from one surface and places it onto another.

As indicated, in addition to being a graphical representation of displayable data, an object can be a portal i.e., a transparent window into any portion of any surface. As indicated, a portal refers to a portal representation object. Each portal is physically stored in computer memory as a portal data object. Exactly what is visible through the portal is given by portal "look-on" which is stored as look-on address attribute as part of each portal data object. Otherwise, portal data objects are stored the same as data objects described previously. The portal look-on contains [x, y, z, surface] parameters, where the "surface" parameter indicates which surface is visible through the portal, x and y indicate the portion of the surface that the portal is looking onto, and z indicates the scale at which the surface appears when viewed through the portal. As indicated, the screen is a special portal object which address is undefined, since it is not located on any surface. However, a portal data object stored for the screen has a defined look-on attribute that indicates a portion of a surface that is displayed on the display area.

To magnify, reduce, or pan information displayed within a selected portal, the system (1) determines a new look-on of the portal that would provide the desired display change operation, and (2) redisplays the stored objects of the interface using the new look-on of the selected portal. If the display change has to be performed for the entire screen, the look-on of screen portal data object is changed appropriately, otherwise the look-on of another portal data object ("inner" portal) is changed.

As discussed previously, a wide variety of applications can be improved by utilizing the fractal interface capabilities because this invention is not limited to special purpose hardware. The fractal interface requires only a generic workstation which can support color or black and white display, because the display operation simply consists of copying internal bit-mapped representations of images to the workstation screen, which is a standard operation on most terminals.

BRIEF DESCRIPTION OF THE DRAWINGS

These and other objects, features, and advantages of the invention will be more readily apparent from the following detailed description of the preferred embodiment in which:

FIGS. 2–5 provide an example of information display using the interface of this invention;

DETAILED DESCRIPTION OF THE PREFERRED EMBODIMENT

This disclosure is organized as follows. First, an illustration of a conventional computer architecture that can support the fractal interface is disclosed. Second, an example of information retrieval using the fractal interface is provided. Third, the physical storage of the displayable objects of information of the fractal interface is described. Fourth, the concepts of an absolute and a relative address are introduced and procedures for converting from one type of an address to another are disclosed. Also, a procedure for determining a sequence of objects and points that are located "under" a point within a given portal is disclosed. Fifth, a procedure for entering data into the memory of the interface is described. Sixth, a procedure for displaying the stored data is disclosed.

1. Computer Architecture

Figure 1:
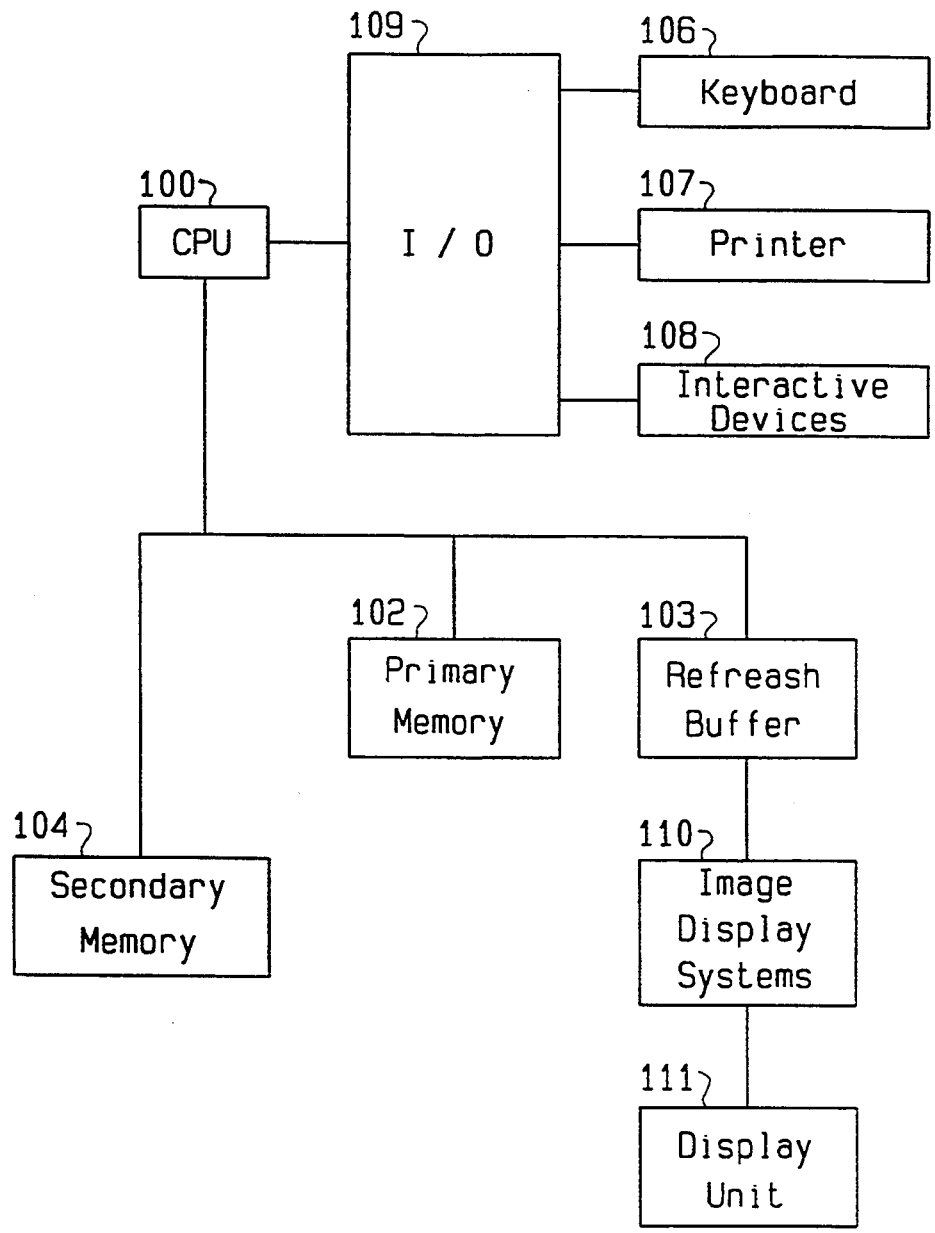
FIG. 1 schematically illustrates an example of a conventional computer architecture that can support the fractal interface.

FIG. 1 shows an example of a conventional computer system which is adaptable for implementing a fractal interface. Such system comprises a central processing unit (CPU) 100, memories 102, 103 and 104, interfaces 109, peripheral devices 106, 107, 108, a raster image display system 110, and a raster display unit 111. The CPU 100 executes instructions and processes data stored in the primary memory 102. Also, the CPU 100 transfers instructions and data between the secondary memory 104 and the primary memory 102. In addition, the CPU controls peripheral devices through interfaces 109. Such peripheral devices may include a keyboard 106, a printer 107, and interactive input devices 108, for example, a mouse. Usually, such conventional computer system, which is adaptable for implementing the fractal interface, is controlled by an operating system (not shown), such as Unix®.

The refresh buffer 103 stores information for display on the display area of the display unit 111. In this embodiment of the invention, the display unit 111 is a conventional 1024×1024 pixel raster display. Each point of the display information (pixel) can be stored in the refresh buffer 103 as one bit if monochrome display is utilized, or as several bits for a color display. The image display system 110 scans the refresh buffer 103 and displays data on the display area of the display unit 111. Usually, the display is refreshed 30 to 60 times per second. The refresh buffer 103 can be implemented as a block of primary memory 102 or as part of the image display system 110. A further discussion of raster display capabilities is provided in *Fundamentals of Interactive Computer Graphics* by J. D. Foley and A. Van Dam, section 3.5 and chapter 12 (Addison-Wesley Publishing Co.).

It should be noted that the computer system in FIG. 1 is shown for the purposes of illustration only. As indicated, the fractal interface can be implemented on most commercially available computer systems. For example, in one preferred embodiment, a Sun ® 3/160 workstation is utilized.

2. Example

Figure 2:
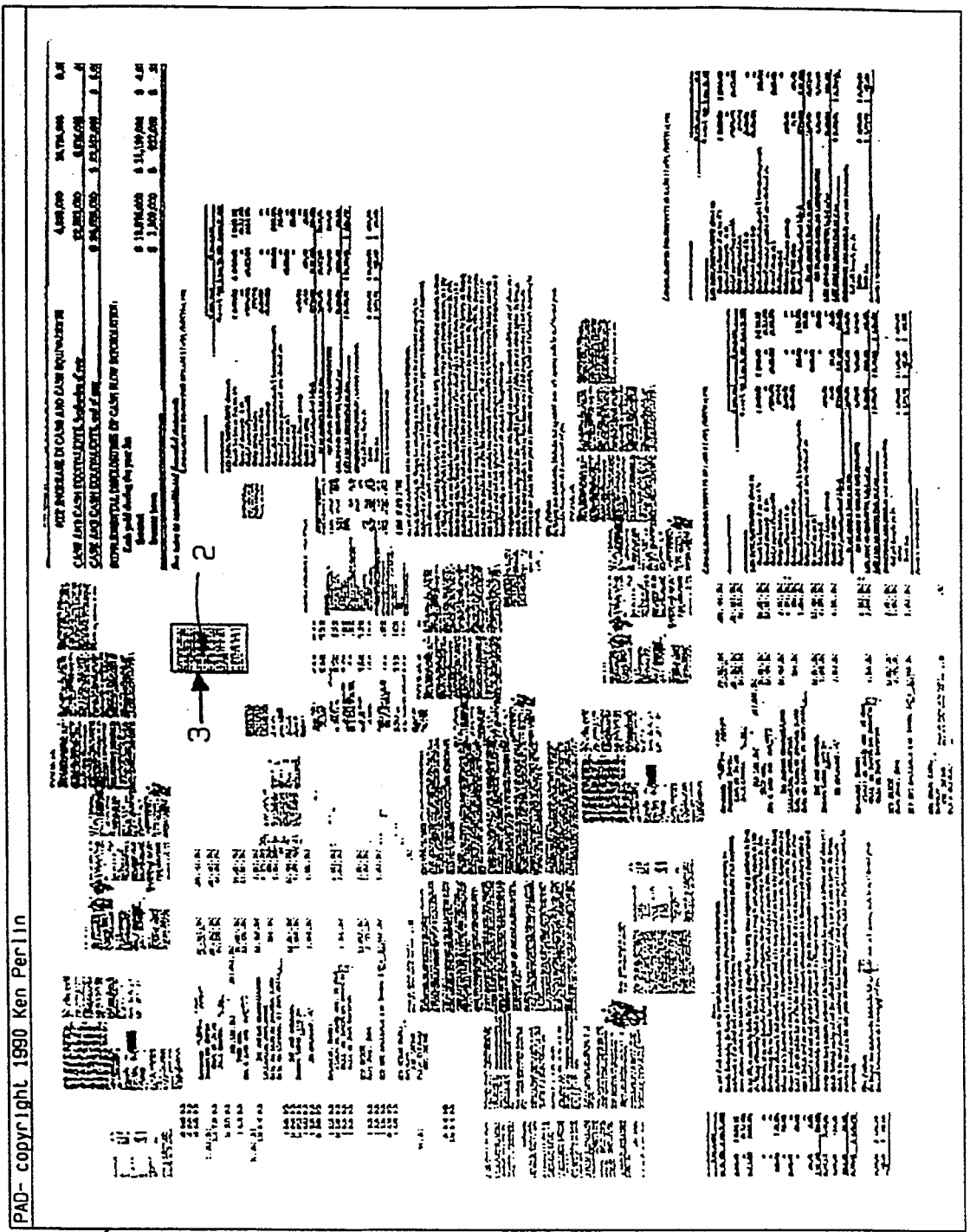

FIGS. 2-5 illustrate an example of information displayed on the display area of a computer system that utilizes the fractal interface. In FIG. 2, the information displayed on the display area 1 (which corresponds to the screen portal), is "zoomed out" so that the displayed objects appear very small and practically unreadable. However, a user can easily perceive the general arrangement of information and can distinguish different types of data, such as pages of text or tables of numerical data. FIG. 2 also shows a cursor 2 located within an object 3. To view the object 3 in greater detail, the displayed data has to be magnified in the general area of this object.

Figure 3:
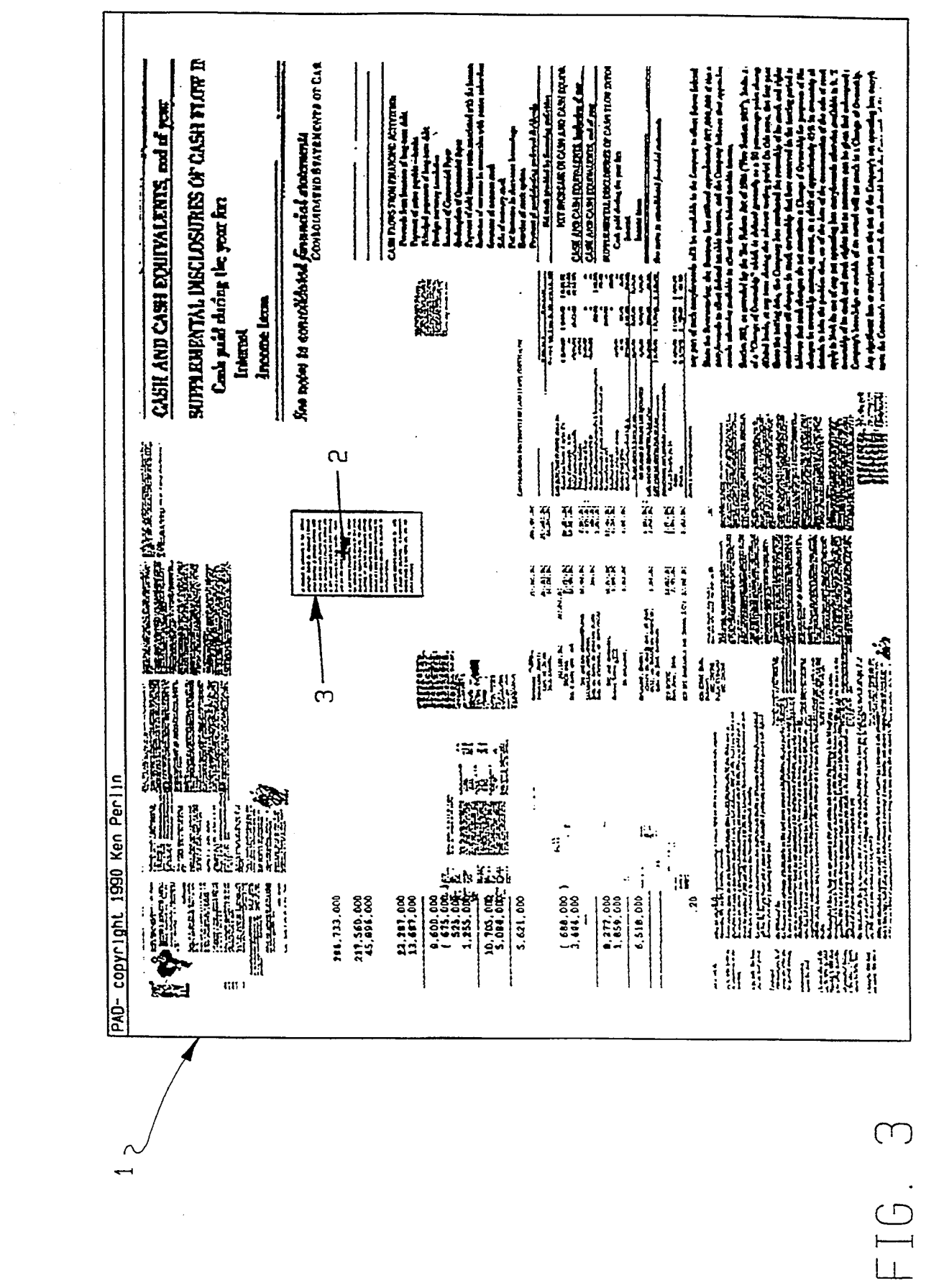
Figure 4:
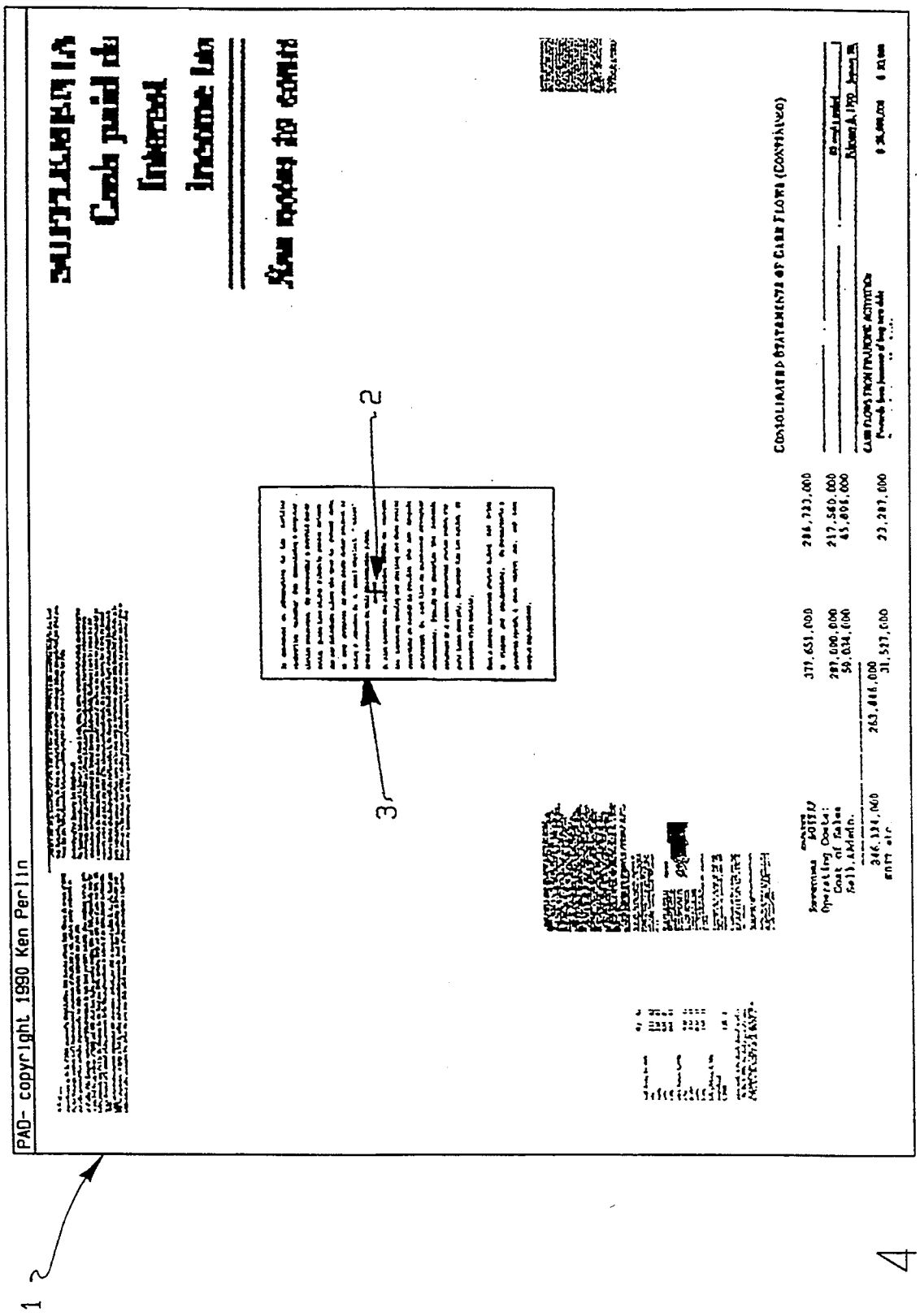
Figure 5:
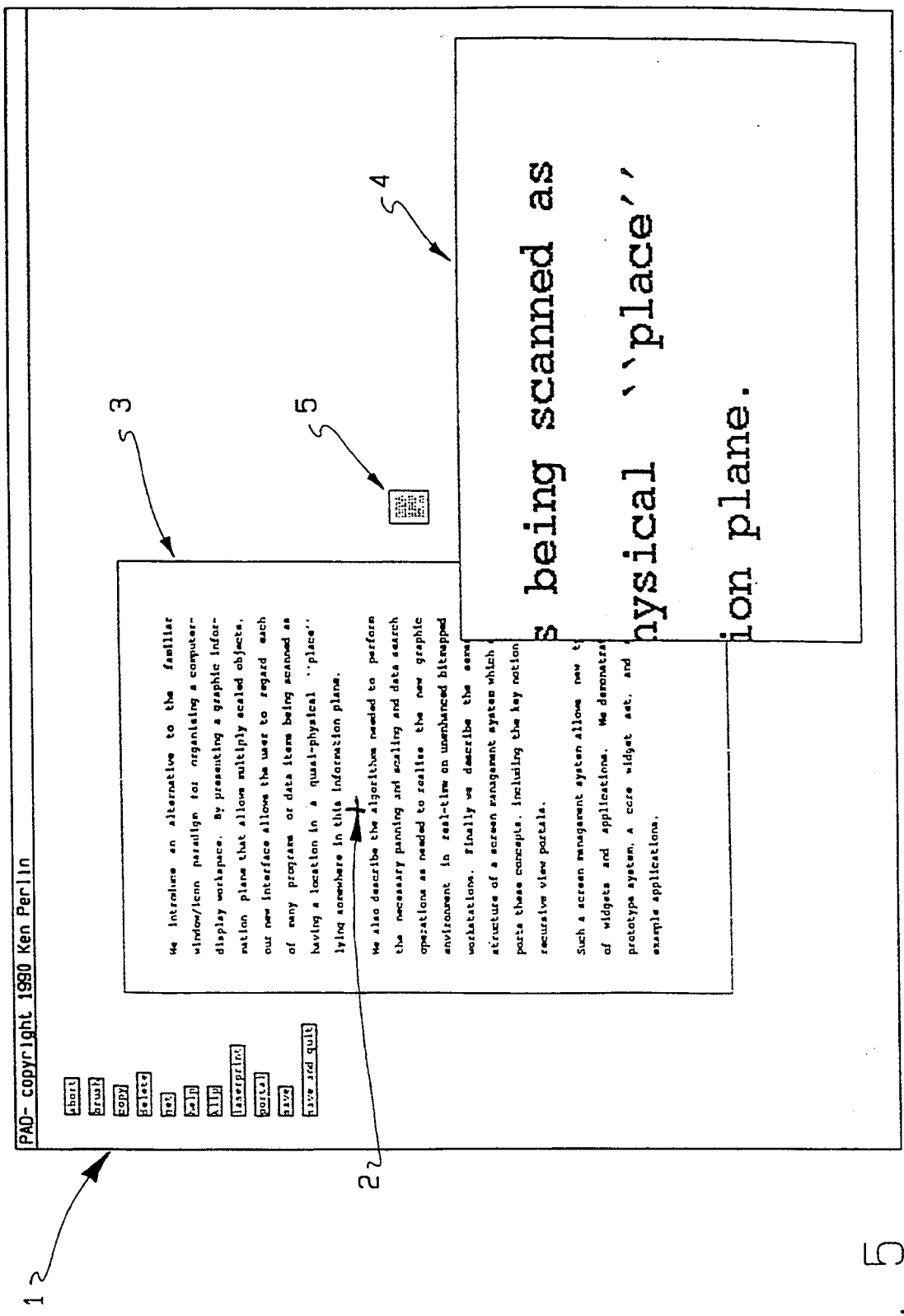

FIG. 3 shows the display area 1 after a zoom by a factor of 2 about the pixel at the cursor. Note that the pixel at the cursor remained stationary, while the rest of the display has changed such that fewer items of data are shown at greater size and/or detail. FIG. 4 shows the display area 1 after another zoom by a factor of 2 operation about the same location of the cursor. Finally, FIG. 5 shows the information on the display area further magnified about the cursor and a portal 4 that looks onto the same surface where the object 3 is located. As illustrated, a portion of the object 3 is visible within the portal 4. Note that the object 3 displayed within the portal 4 is magnified in comparison to the object 3 displayed within the "top-level" screen portal that corresponds to the display area 1, which means that the z coordinate of the look_on address of the portal 4 is less than the z coordinate of the screen portal. Also, note that an object 5 is now visible on the display area. This object was completely invisible when the information was zoomed out in FIGS. 2-4.

3.0 Data Structure

Figure 6:
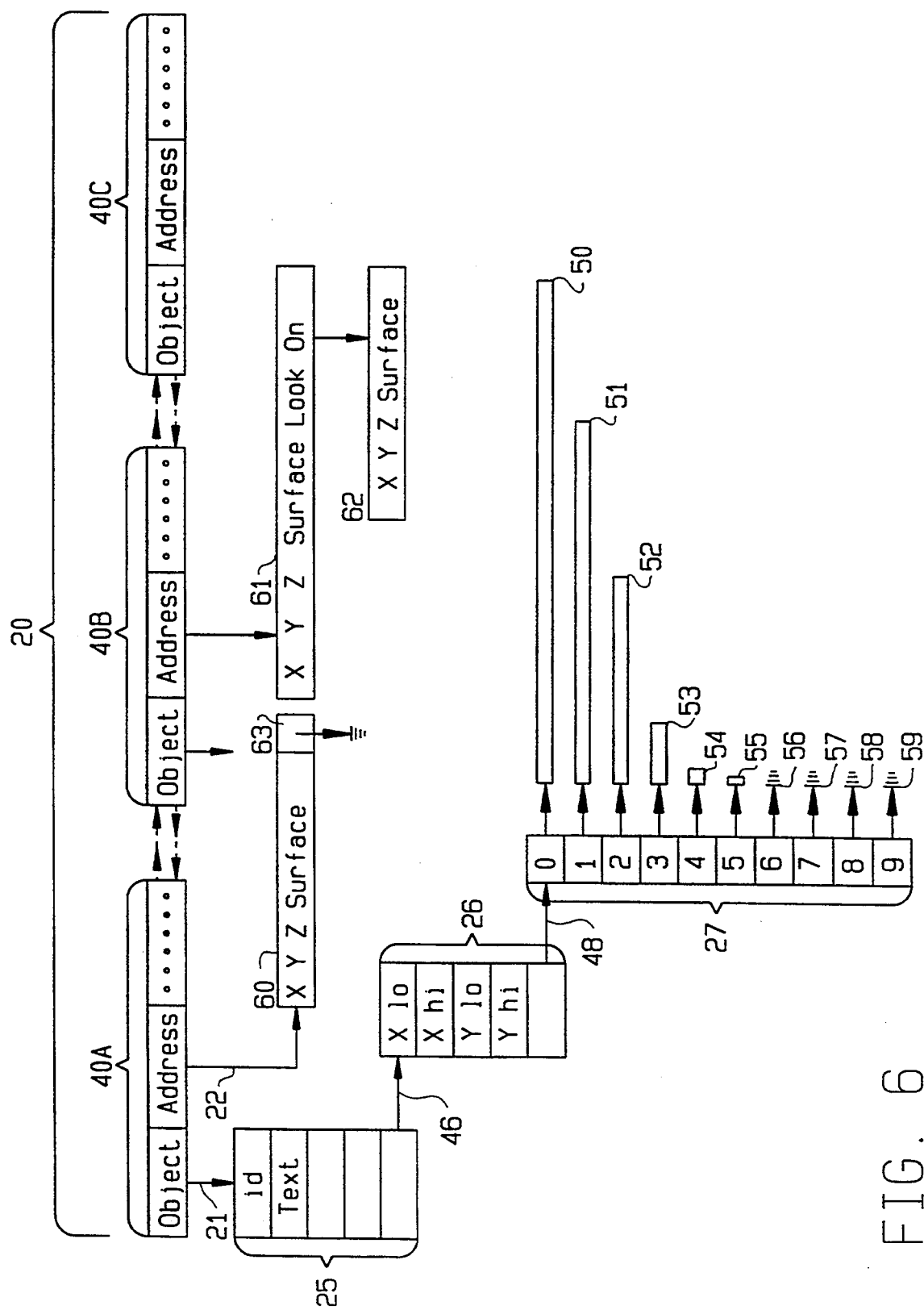
FIG. 6 schematically illustrates a data structure for physically storing objects of the fractal interface in computer memory.

FIG. 6 schematically illustrates the physical storage provided for items of information by the fractal interface. As illustrated, a doubly linked list of records 20 is physically stored for the data objects of the interface. Linked lists are described in various computer publications, for example, see *Data Structures Using Pascal* by A. M. Tenenbaum and M. J. Augenstein, chapter 4 (Prentice-Hall, 1981). Each record 40 in the linked list 20 represents one object (including portal objects). Each record 40 contains pointers that indicate memory addresses of the records provided for each data object. More specifically, pointer 21 points to the object's graphical representation and pointer 22 points to the object's address. In addition, records 40 may contain other fields required in a specific embodiment of the invention. For example, a "tag" discussed subsequently, which indicates whether a data object has been processed during a particular operation, can be implemented as a binary field in the records 40.

Three records 25, 26 and 27 are stored for the object's graphical representation as part of the data object. Record 25 contains a pointer 46, which is the memory location of the second record 26, described subsequently, and several miscellaneous fields, such as an object ID and an ASCII text string provided for text objects. The record 25 may also contain additional fields that are useful in the context of a specific embodiment of the invention. The second record 26 contains the data representing the coordinates (xlo, ylo, xhi, yhi) of a bounding rectangle of a corresponding object and a pointer 48 that points to the third record 27 where the sequence of compressed images (pixlists) is stored. The bounding rectangle defines the outer x and y coordinates of an object and it is stored as coordinates of the lower left and the upper right corners of a rectangle that circumscribes the object. The values stored for these coordinates represent the dimensions of an object, as created, with respect to the coordinate system of an intermediate image, described subsequently, and not with respect to a particular surface.

A sequence of compressed images of different resolution (pixlists) is stored as files combined in the array 27 (object_array). The individual pixlist structures are identified as 50, 51, 52, 53, 54, 55 and are defined below. In this embodiment of the invention, the object_array 27 is an array of pointers to pixlists, where object_array[0] points to the encoded full size image of an object as created (i.e., an image having $nx \times ny$ pixels, where nx is the number of pixels in the x direction and ny is the number of pixels in the y direction), object_array[1] points to the encoded quarter size image having $(nx/2) \times (ny/2)$ pixels etc., such that each subsequent image of the object_array has one quarter the number of pixels of the previous image. The sequence of images stored as pixlists, that are pointed by the locations in the object_array 27, terminates when the resolution of an image becomes less than $[1 \times 1]$, i.e., one pixel. For all such trailing entries a NULL pointer is used as indicated by 56, 57, 58, 59.

In this embodiment of the invention, it is assumed that an object can contain only as many pixels as the display area. Since the resolution of the display area of this embodiment is $[1024 \times 1024]$ pixels, an array of 10 slots is allocated for the object_array shown as 27. In other embodiments, a larger array can be provided for higher resolution images. Also, in other embodiments, a linked list or another appropriate data structure can be utilized instead of an array.

Each pixlist is stored as a byte string such that one bit represents a display pixel (i.e. each pixel is stored as zero or one) and every byte represents eight contiguous pixels across on a scan line. If a color terminal is used, several bits can be stored for each pixel. The compression scheme for pixlists in which one pixel is represented by a single bit is provided below.

The first 3 bytes of the string define the total length in bytes of the pixlist byte string. The next two bytes indicate the number of scan lines in the image, and the following one byte (or several bytes for longer scanlines) indicates the number of bytes per scan line of the image. Next, the information for each scan line with at least one non-zero bit (pixel) is stored. The scan lines which have only zero bits (pixels) are not stored at all.

For each scan line, which has at least one non-zero pixel, the data is stored as follows. First, two bytes which indicate the scan line number within the image are stored. Next, runs of contiguous groups of bytes in which at least one pixel is "one," are stored. Such contiguous groups of bytes are referred to herein as runs or run-lengths. The storage for each run starts with one byte which indicates the position of the first byte of the run within a given scan line. (Note that in another embodiment several bytes can be used in order to store longer scan lines). The next byte indicates the number of bytes in a particular run. This byte is followed by one or more bytes of the run of imaging data.

The end of each scan line is indicated by one byte (called the end-of-scan-line mark) which has the value equal to the number of bytes in the scan line (several bytes can be used for longer scan lines). Finally, after the encoding of the last non-zero scan line, the end of the pixlist is indicated by 2 bytes (called the end-of-image mark) that store the number of scan lines of the image.

This compression scheme is very compact because for contiguous zero pixels that are longer than one byte nothing is stored in computer memory and the scan lines that contain only zero pixels are not stored at all. Another advantage of this encoding scheme is that imaging data can be decompressed and displayed very rapidly, since this compression scheme organizes data as bytes of imaging information. In the refresh buffer 103, data is also usually stored as contiguous bytes of a display image. Therefore, images, compressed according to the format described above, can be readily decompressed and converted to a format suitable for display using a conventional image display system.

The address record, illustrated at 60, defines the location and scale of a given object with respect to a surface where the object is located. The address of each object is represented by four variables [x, y, z, "surface"]. The variable "surface" identifies the surface of the particular object. As indicated previously, the x and y coordinates of the address record define the location of the object with respect to the coordinate system of the surface and the z coordinate represents a number of surface units covered by each pixel of the object. In this embodiment of the invention, the z coordinate is represented by positive numbers.

A portal object is stored as a portal data object as illustrated by record 40B. A portal data object also contains information, that indicates the graphical representation of the portal (not shown), stored the same as discussed previously in records 25, 26, 27. The address of a portal is stored in the data portal as 61. This address record contains an additional variable, "look_on". The "look_on" is a pointer which is a memory location of the [x, y, z, surface] look_on address record shown as 62. As described previously, the portal look-on defines the portion of a surface which is seen "through" the portal, and the scale (z) at which the surface is seen. Note that for an object that is not a portal, the look_on pointer (63) is NULL. Also, as indicated, there is one screen portal data object. The corresponding screen object itself is not located within any surface and its address is [0,0,1,0]. The screen data object is identified as the only object that has a zero surface address.

The operations of displaying the data stored in the data structures of the fractal interface and entering new data into the data structures are accomplished by the CPU executing control instructions stored in the computer memory. Generally, the control instructions of the fractal interface can be characterized as comprising a data entry and storage portion, and a data display portion. The data entry and storage portion is described in conjunction with FIGS. 12–13. It is responsible for converting input data, which is interactively entered by a user or stored in the secondary memory as a file, into the records of the data structures described in conjunction with FIG. 6. The data display portion is described in conjunction with FIGS. 14–18. It is responsible for selecting and displaying the objects represented by the interface in response to a command, which may be either an interactive input by a user or an instruction in an application program. The following section 4 and FIGS. 8–11 describe several operations that are utilized during both data entry and data display operations.

4. Absolute and Relative Addresses

As indicated each object stored in the memory of the interface as a data object has an [x, y, z, surface] address. The x and y coordinates define the location of the object with respect to a surface of the object. The z coordinate of the address indicates the number of units of the surface that correspond to one pixel of the object. This address is referred to herein as an absolute address, because x, y, z coordinates indicate the absolute location and scale of the object with respect to the surface where it is located. In addition, it is useful for some operations to define a relative [x, y, z] address of a point located on a given object. The x and y relative coordinates of the relative address indicate the location of the point with respect to the object, and its z coordinate indicates the number of the pixels of the object associated with the point.

Figure 7:
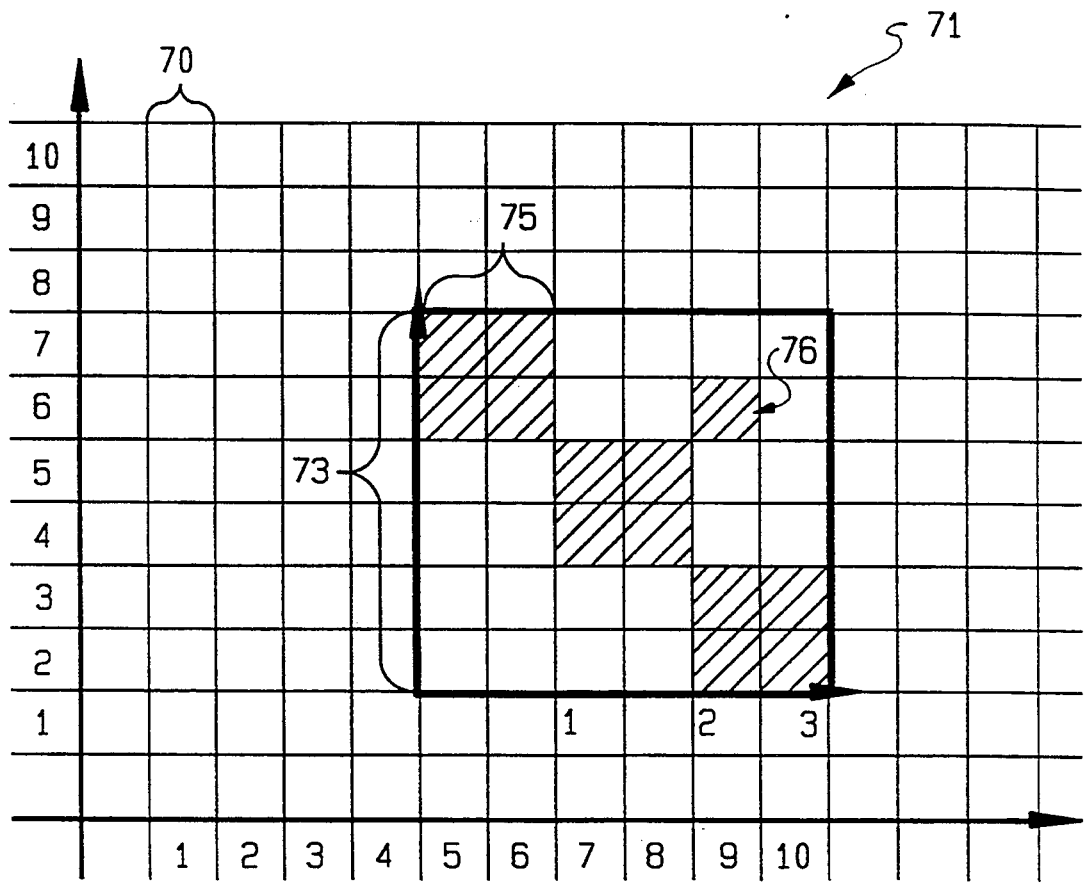
FIG. 7 is an example schematically illustrating the notion of absolute and relative addresses.

FIG. 7 is an example illustrating the notion of absolute and relative addresses. Each unit 70 on the surface 71 corresponds to one displayable pixel of the surface at magnification 1 (no magnification). Let us assume that object 73 was created at magnification 2; therefore each unit such as 75, of the object 73 has the size of 2×2 units of the surface 73. The left-hand bottom corner of the object (the origin of the object's coordinate system) is at x=5, y=2 with respect to the coordinate system of the surface 71.

Let us consider a point 76 located on the object 73. This point is twice smaller in each x and y directions than each unit of the object 73. Therefore, z coordinate of the point 76 with respect to the object 73 is 0.5. Also the point 76 is at x=2, y=2 with respect to the coordinate system of the object 73. Thus, the relative address of the point 76 with respect to the object 73 is [2,2,0.5]. However, the coordinates of the same point 73 with respect to the surface 71 is [9,6,1, surface]; this address is referred to as an absolute address of the point.

The following two operations on the relative and absolute address are provided in the fractal interface as two computer functions. The first computer function is OFFSET_ADDR(rel, abs). This function combines a relative address and an absolute address to create a new absolute address. For example, given a location of a point with respect to a portal (relative address) and the look-on address of a portal with respect to a surface (absolute address), this function determines the absolute address of a point with respect to the surface. The OFFSET_ADDR function computes the absolute address [x,y,z, surface] of a point with respect to a given surface as follows:

$x = rel.x * abs.z + abs.x$ $y = rel.y * abs.z + abs.y$ $z = rel.z * abs.z$ surface = abs.surface The function REL_ADDR (abs1, abs2) performs the operation which is essentially the inverse of the OFFSET_ADDR. Namely, it combines two absolute addresses in order to obtain a relative address. For example, if an input to the REL_ADDR function is an absolute address of a point with respect to a surface and a look-on address of the portal with respect to the same surface, the output of the REL_ADDR function is a relative address of the point with respect to the portal. To compute [x,y,z] coordinates of the resultant relative address this function performs the following computations:

$x = (abs1.x - abs2.x) abs2.z$ $x = (abs1.y - abs2.y) abs2.z$ $z = abs1.z / abs2.z$ FIGS. 8–11 illustrate the procedure employed in identifying the "innermost" portal at the location of the cursor on the screen and determining the address of the point at the cursor with respect to the surface that the innermost portal is looking onto. This procedure is utilized for entering data into the fractal interface and in displaying information. The "innermost" portal is defined herein as the last portal in the nested sequence of portals within which a point on the screen is located. For example, if the only portal under the point is the screen portal, the screen portal is the innermost portal. If there is another portal on the screen and the point is within this portal, this other portal is the innermost portal.

Generally, this procedure comprises the following steps. First, the system creates and stores in memory a list of pairs, each of which consists of a pointer to data object that corresponds to an object located under the cursor and a relative address (rel_addr) of the cursor with respect to the coordinate system of the object, i.e., pairs [object, rel_addr]. This list of [object, rel_addr] pairs identifies the successive objects (including portals) that are found "underneath" the cursor on the screen. The list also provides the relative positions of the cursor with respect to each of the objects. After the list is created, the system locates the last pair in which the data object has a look-on address record and represents the object which is a portal. This portal is the innermost portal at the location of the cursor. The system also determines the absolute address of the point at the cursor with respect to the coordinate system of the surface that the innermost portal is looking onto.

Figure 8:
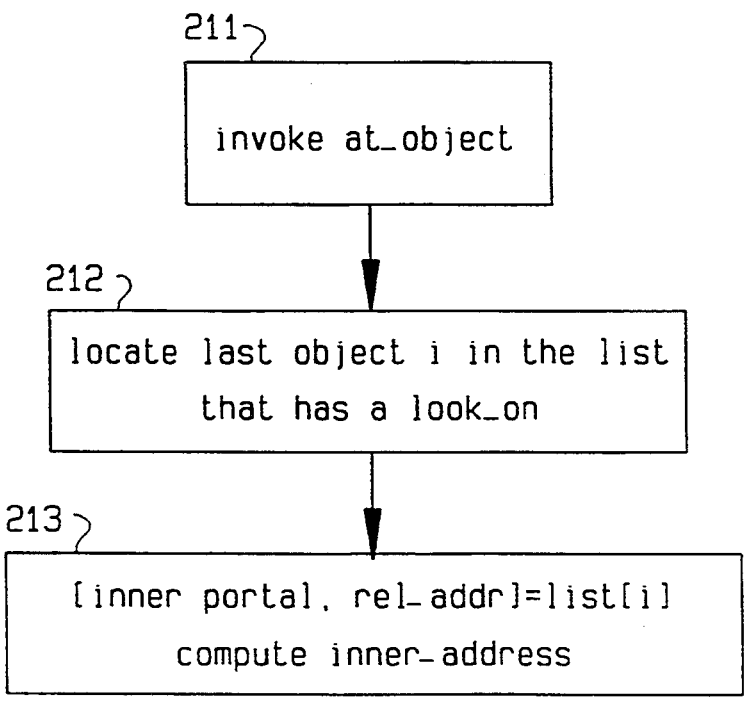
FIG. 8 is a flowchart illustrating the steps of a procedure that determines an inner portal under a cursor and address of the point that correspond to the cursor with respect to the surface of the inner portal.

The steps of this procedure, are shown in FIG. 8. The procedure is referred to as

FIND_INNER_PORTAL_AND_ADDRESS.

At block 211 the system invokes an AT_OBJECT computer function, discussed subsequently in conjunction with FIG. 9, which builds the list of the data objects and the corresponding relative addresses that are found "under" the cursor, i.e., the list of [object, rel_addr] pairs. The inputs to this function are the screen data object and the coordinates of the cursor with respect to the screen. Then, at block 212, the system locates the last pair (list[i]), in which the data object has a look-on address record. As indicated previously, this object is the innermost portal (inner_portal). Finally, at block 213, the absolute address (inner_address) in the list[i] pair is determined. This address is the absolute address with respect to the coordinate system of the surface the inner_portal is looking onto. The inner_address is determined by invoking the OFFSET_ADDR function as follows:

inner_address=OFFSET_ADDR(rel_addr,
      look_on of the inner_portal)

AT_PORTAL and AT_POINT are two computer functions that create the list of the [object, rel_addr ] pairs. These functions are mutually recursive, i.e., the functions invoke each other. Recursive functions are commonly employed in computer technology; for example see *Data Structures using Pascal* by A. M. Tanenbaum and M. J. Augenstein, ch. 3 (Prentice-Hall, Inc.)

Figure 9:
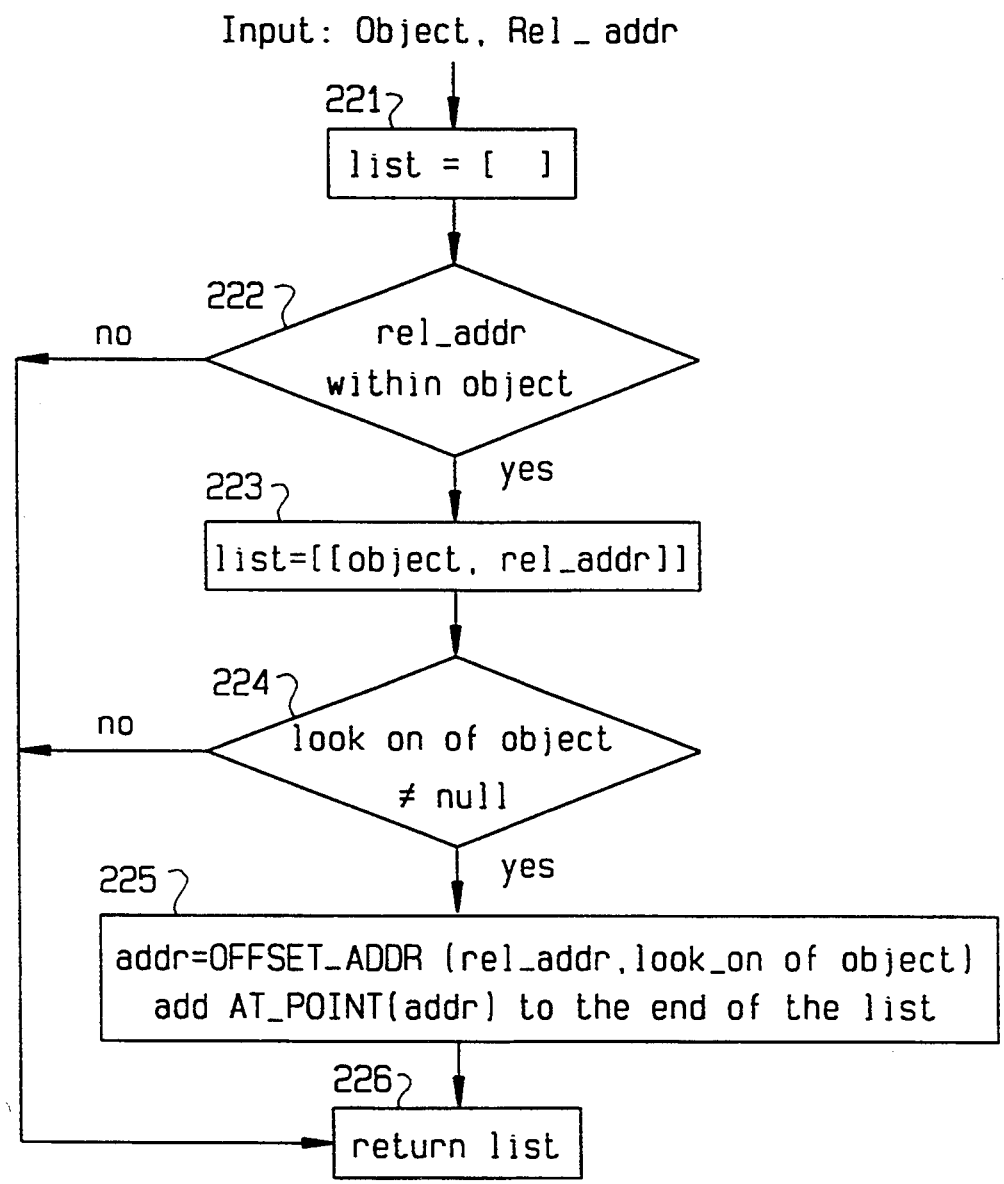
FIG. 9 is a flowchart illustrating the steps of the OBJECT_THRU_PORTAL procedure.

The steps of the AT_OBJECT function are illustrated in FIG. 9. The input to the function is a pointer to a data object (referred to as object on the flowchart) and a relative address of a point located within that object (reladdr). As indicated, typically, when the function is invoked for the first time, the data object corresponds to the screen portal and the reladdr indicates the coordinates of the cursor with respect to the screen. The output of this function is the list of [object, reladdr] pairs, described above.

Figure 10:
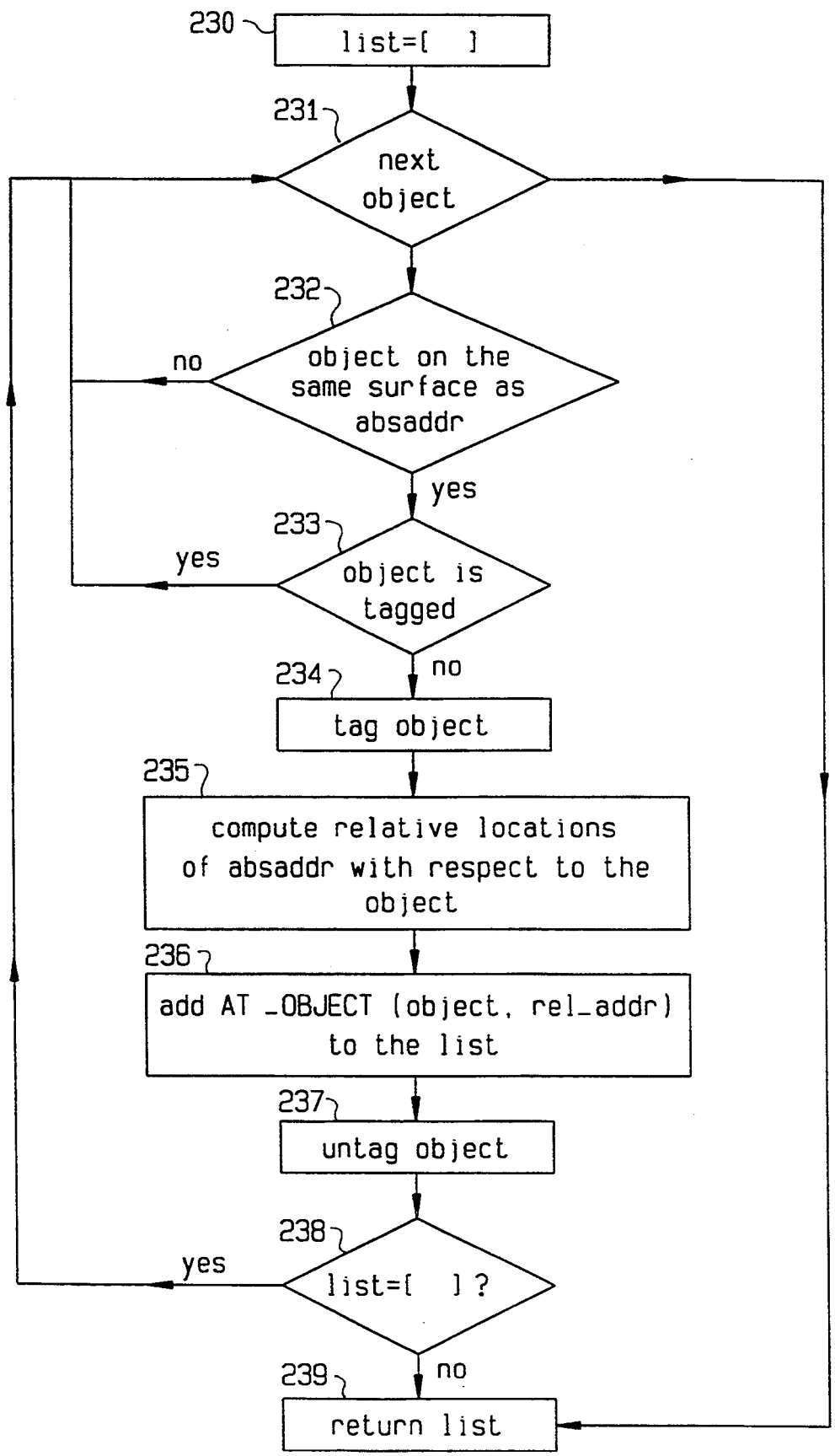
FIG. 10 is a flowchart illustrating the steps of the OBJECT_AT_POINT procedure.
Figure 11:
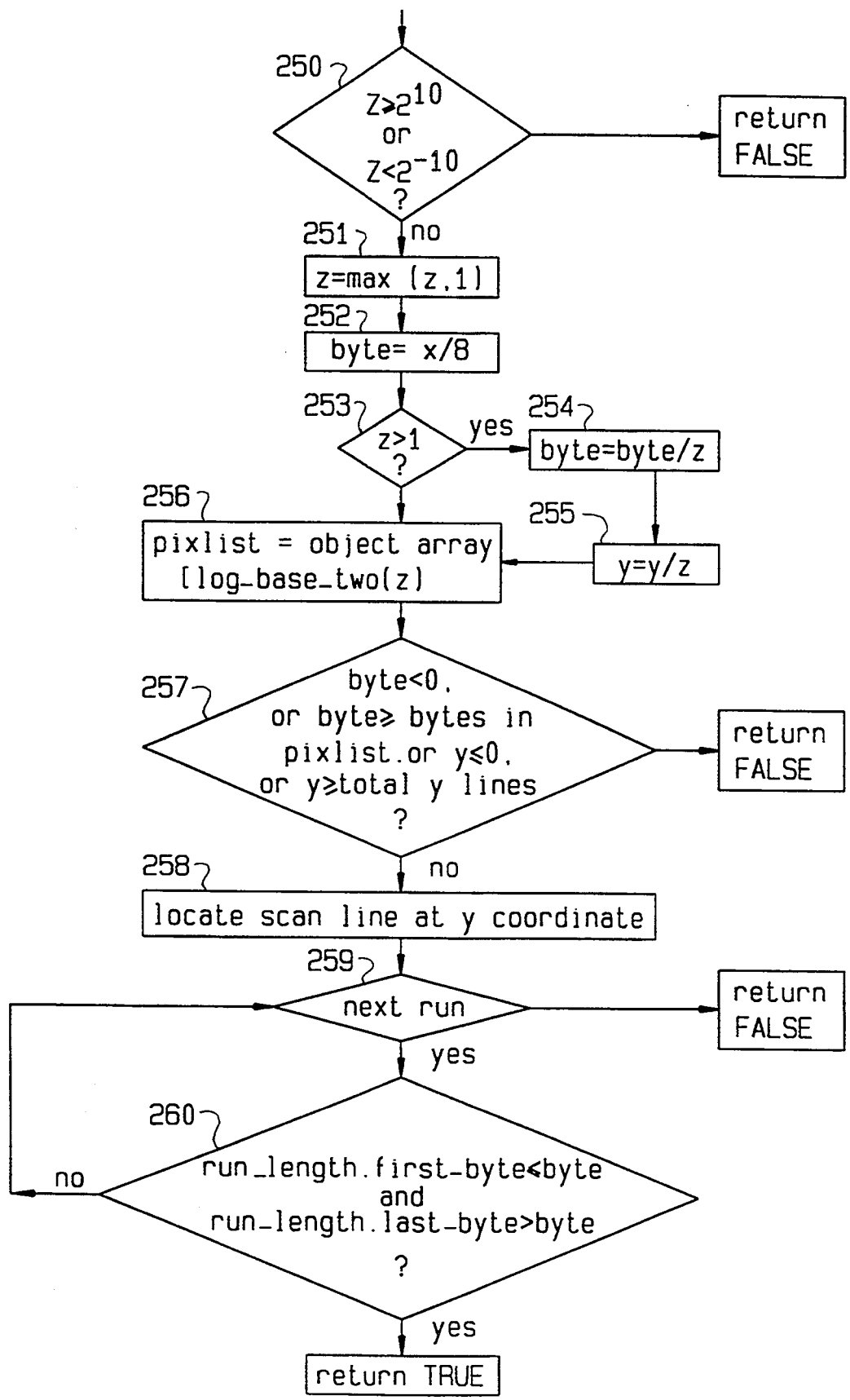
FIG. 11 is a flowchart illustrating the steps of the procedure that determine whether a point with a specified address is within a given portal.

First, at block 221, the system defines in memory an empty list of [object, rel_addr] pairs. Next at test 222, the function IS_POINT_ON_OBJECT, described subsequently in conjunction with FIG. 11, is invoked to verify whether input "rel_addr" is located within the input object. If the relative address is outside the object (i.e., IS_POINT_ON_OBJECT returns FALSE), the control is transformed from test 222 to block 226, and the function AT_OBJECT returns an empty list. Otherwise, at block, 223 the list is initialized to contain the [object, rel_addr] pair that was passed to this function as input. If the input data object is not a portal (i.e. the look_on attribute of the data object's address is NULL), flow is transferred to block 226, and a list containing the input pair is returned. Otherwise (the input data object is a data portal object), control is transferred to block 225, where the following operations are performed. First, the system computes the absolute address of rel_addr with respect to the surface of the object, which is known to be a portal, by invoking the OFFSET_ADDR function. This absolute address is referred to as "addr" in FIG. 9. Then, the function AT_POINT, described in conjunction with FIG. 10, is invoked with the absolute address "addr" as an input. The output of AT_POINT is a partial list of [object, reladdr] pairs. This partial list is then appended at the end of the list. Finally, at block 226, the function terminates and returns the list of pairs as output.

FIG. 10 illustrates the steps of the function AT_POINT. This function traverses the objects (40) stored in the data structure of the interface and locates the objects that intersect the point located at the absolute address (absaddr), which is the input to this function.

First, at block 230, the function defines the list of [object, rel_addr] pairs as an empty list. Next, at block 231, the function locates the next data object 40 in the linked list 20 shown in FIG. 6. For the first iteration of the procedure of this function (this function is performed in a loop), the next data object is the first object in the linked list 20. If, at test 231, all the data objects of the linked list 20 have been traversed, the return instruction is executed at block 239, and control is transferred back to the AT_OBJECT function of FIG. 11. Otherwise, at test 232, the system tests if the data object selected at 231 belongs to the surfaces specified as part of the input absolute address (absaddr). If so, the control is transferred to test 233, otherwise control returns to test 231. At test 233, the system tests whether the data object selected at test 231 is "tagged." A data object can be tagged using various methods well known in computer technology, for example, by designating a bit in the object record 40 and setting the designated bit. The tags are provided in order to avoid examining a portal which is looking onto itself. If the data object is tagged, control returns to test 231, otherwise control is transferred to block 234, where the object is tagged.

At block 235, the system computes the relative position of the input absolute address (absaddr) with respect to the object selected in test 231 using the REL_ADDR function described previously which is invoked as follows:

reladdr=REL_ADDR(absaddr, address of the
      object)

Next, at block 236, the function AT_OBJECT is invoked with the inputs that are the pointer to the data object selected at test 231 and the relative address with respect to the object determined at block 235. Also at this step, the list of [object, reladdr] pairs, returned by AT_OBJECT, is added to the list of pairs determined in this function. At block 237, the data object is untagged by, for example, resetting an appropriate bit in the object record. Next, at test 238, the system checks whether the list of pairs is still empty, i.e., an empty list has been returned by AT_OBJECT. If so, control is transferred back to test 231 where the next data object is examined; otherwise, control is transferred to block 239.

FIG. 11 illustrates the procedure for determining whether a point specified by its relative address [x, y, z] with respect to an object, is within that object at a reasonably comparable scale. This function is invoked in block 222, FIG. 9, of the AT_OBJECT function. The inputs to the function shown in FIG. 11 are the relative address (rel_addr) of a point and a pointer to the data object record.

According to the procedure of FIG. 11, first at test 250, the system checks if the value of the z coordinate of the input relative address (rel_addr) is a very large number or a very small number. If so, the system discounts the object due to the discrepancy of the scales, and the function terminates. In this embodiment $2^{10}$ is selected as a very large number and $2^{-10}$ is selected as a very small number. If the value of z is not greater than $2^{10}$ or less than $2^{-10}$, control is transferred to block 251, where the system adjusts the value of z to a number which is greater than or equal to 1. Next, at block 252, the system determines at which byte of the object horizontally the reladdr is located. Since each byte contains eight (8) bits, this is accomplished by dividing the x coordinate of the input address by 8. This value is stored in the variable "byte." Next, at test 253, the system checks if the value of z is greater than one. If so, to locate the input relative address within the image representation of the object, the system adjusts the value of the byte variable, determined in block 252, by dividing it by z (block 254). Also, in this case, at block 255, the system divides the y coordinate of the input address by z.

Then, control is transferred to block 256. Note that if the value of z, as adjusted in block 251, is equal to one, the control is transferred to block 256 directly. In block 256, the appropriate pixlist is selected from the sequence of compressed images stored for the object. To select the pixlist, a function LOG_BASE_TWO(z) is invoked. This function computes $log_2(z)$ by examining the bits of the floating point representation of z, and then selects the closest integer to the value of $log_2(z)$. The pixlist, which is object_array [LOG BASE_TWO(z)], is selected.

Next, at test 257, the system checks whether the value of the byte variable determined at block 252, or 254 is less than zero or equal to or greater than the number of bytes in the pixlist selected at block 256. The system also checks whether the value of the y coordinate (as adjusted in block 255 if z<1) is less than zero or equal to or greater than the total number of scan lines in the pixlist. If any of these tests are satisfied, the function returns FALSE, since the input rel_addr is outside the input object's bounding rectangle. Otherwise, flow is transferred to block 258, where the system locates the scan line of the selected pixlist. This scan line corresponds to the value of y determined previously. The system traverses all the contiguous runs of bytes of the scan line, and determines whether the byte determined at 252 or 254 is located within any of the runs of the scan line (see tests 259 and 260). If the byte is not located within any of the encoded runs, the system returns FALSE. Otherwise, if at test 260 the byte is located within a run in the selected scan line, the system returns TRUE indicating that a point at rel_addr is within the object.

5. Data Entry

Figure 12:
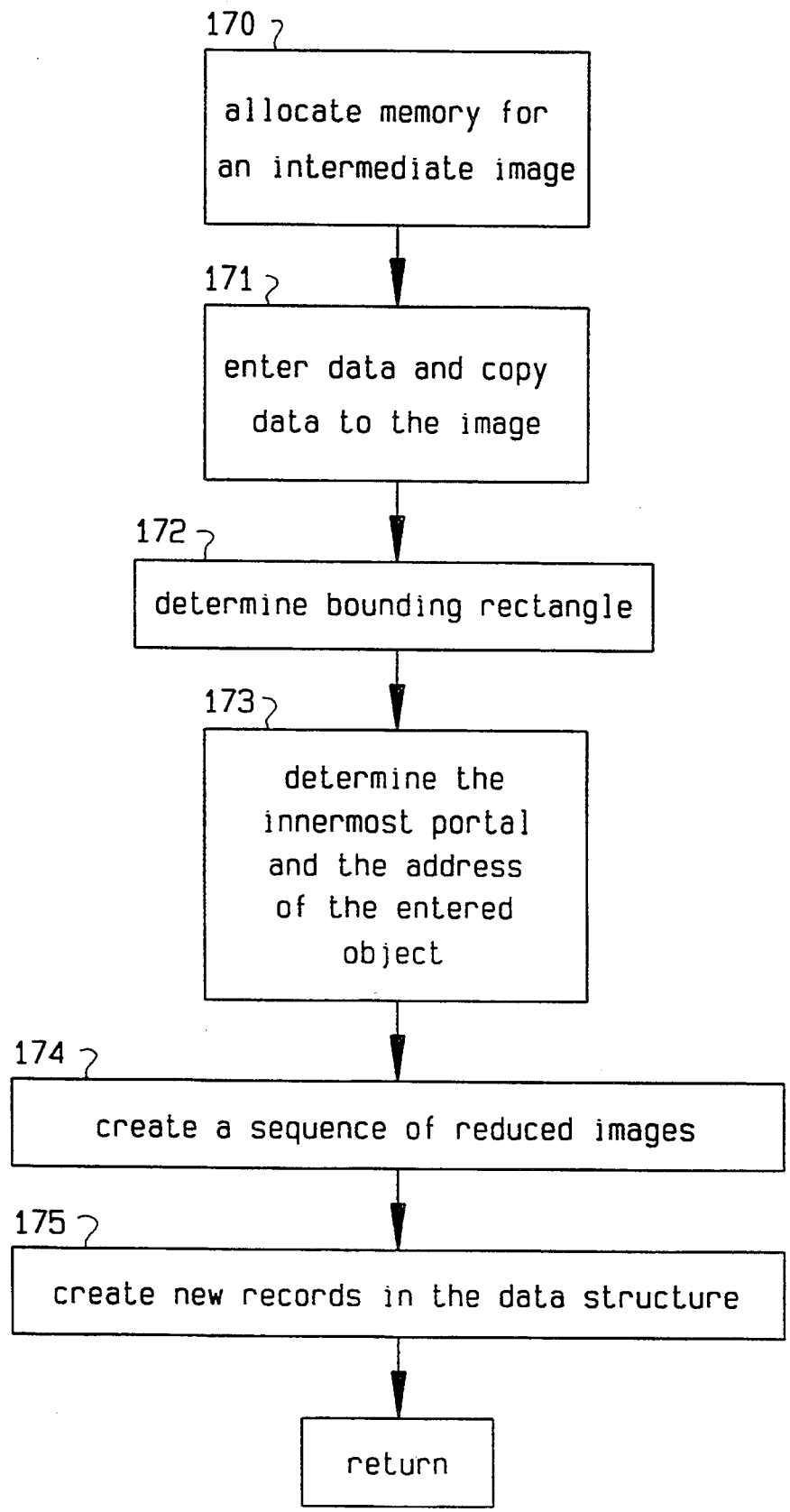
FIG. 12 is a flowchart illustrating the steps of entering the representation of an object using the interface of the present invention.

FIG. 12 illustrates the data entry process. For the purposes of this illustration, let us assume that a user is entering a graphical object using a mouse. First, a user indicates, for example, by depressing an appropriate button of the mouse, that he/she is about to start "drawing" an object. In response, at block 170, the fractal interface allocates a block of computer memory for storing an "intermediate image" that has the same resolution as the display area. For example, if a monochrome display unit is utilized, the block of memory allocated for the intermediate image has the number of bits that is essentially equal to the number of pixels of the display area. If a color display terminal is used, several bits of the intermediate image may be stored for each pixel of the display area. A memory allocation operation is well known in computer technology and is typically provided as part of many high-level computer languages, such as "C" and "Pascal." Also, at block 170, a bounding rectangle is initialized by assigning a zero value to xlo,ylo,xhi,yhi variables, which define the lower left and the upper right corners of the rectangle. As indicated, the bounding rectangle is the smallest rectangle that confines an object.

Next, at block 171, a user starts entering graphical data that represents the new object, for example, by moving a mouse. The system copies each interactively entered dot (pixel) of information to the intermediate image. More specifically, each point is stored such that the location within the allocated block of memory logically corresponds to the position of the dot on the display area. If a user indicates that the process of entering data that represents the new object is completed, control is transferred to block 172 where the system determines the bounding rectangle of the entered object by examining the intermediate image using techniques within the skill of the art. As a result, the xlo,ylo,xhi,yhi coordinates of the bounding rectangle are determined with respect to the coordinate system of the display area. Next at block 173, the innermost portal of the first dot (pixel) entered for this object is determined by invoking the procedure FIND_INNER_PORTAL_AND_ADDRESS described in conjunction with FIGS. 8-11. Also, the address of this object is determined by determining the absolute address of the first entered dot with respect to the surface defined in the look-on attribute of the innermost portal data object. More specifically, if the address of the first entered dot with respect to the screen is (x, y) and the look-on address of the innermost portal is [x',y',z',x'], the address of the entered object is [(x'−x*z'), (y−y*z'), z', s']

At block 174, the sequence of compressed images is created for the entered object according to the procedure described subsequently in conjunction with FIG. 13. Finally, at block 175, memory is allocated for a data object that represents a new object and the data object is included in the linked list 20. The records and pointers that represent the graphical representation and address of the entered object are stored as described in conjunction with FIG. 6.

The process of entering data that is stored in the secondary memory of a computer system as files is similar to the interactive procedure described in conjunction with FIG. 12. First, a user indicates the name of the file that has to be stored as a fractal interface data object. Next, a user indicates interactively where the information stored in the file has to be displayed and the scale at which the file has to be displayed. In response, the system determines the address of this new object, as described previously, and creates a sequence of compressed images, as described in conjunction with FIG. 13. Finally, the system stores the sequence of images and the address of the new object in the data structure of the interface to create a new data object.

Figure 13:
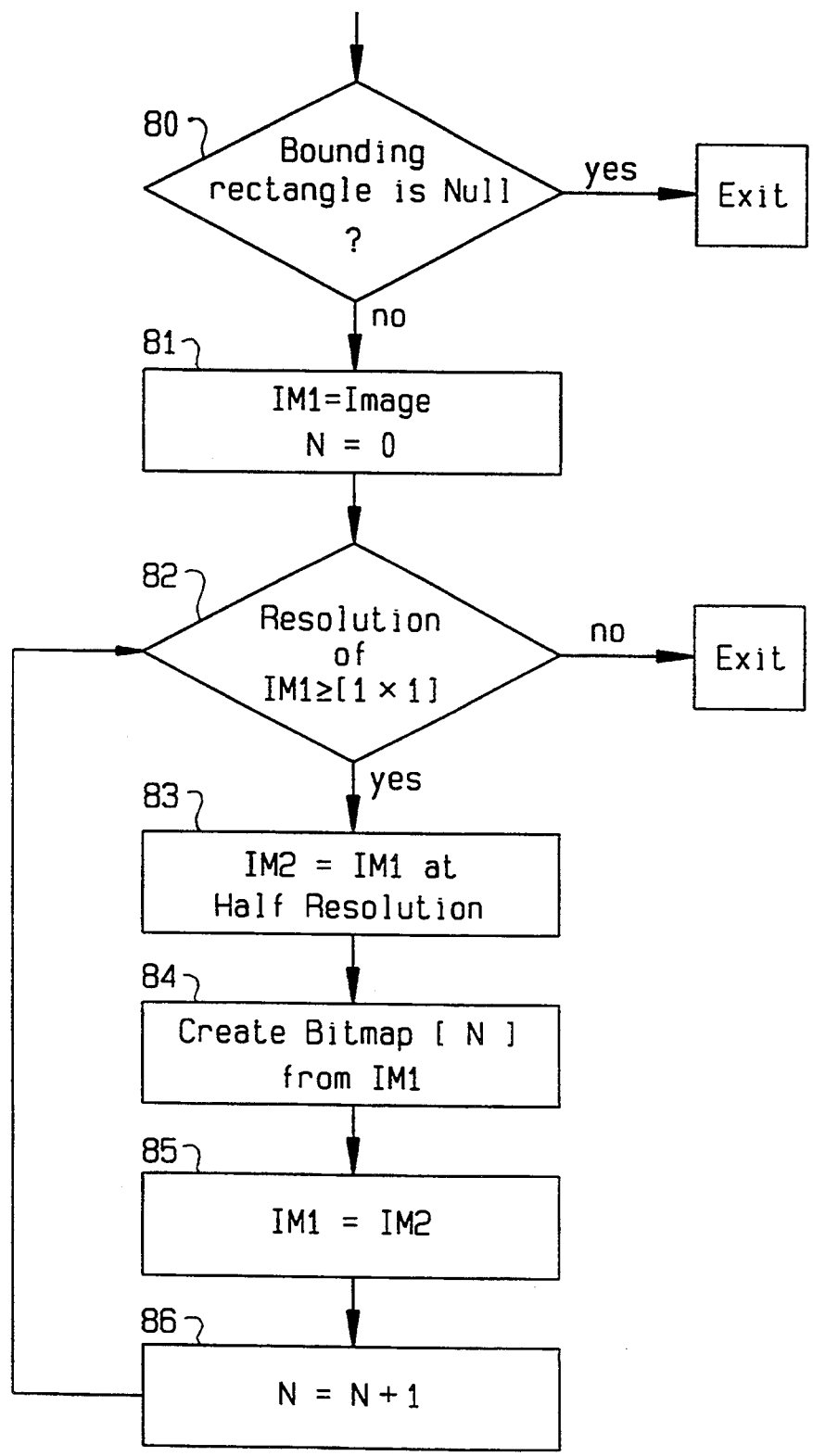
FIG. 13 is a flowchart illustrating the steps of creating a sequence of compressed images.

Referring now to FIG. 13, there is shown a flow chart depicting the procedure for converting an intermediate image to a sequence of compressed images having different resolution. Generally, this procedure is performed in a loop. During each iteration of the loop, the compressed representation of the intermediate image is stored in memory and, then, the number of pixels in the intermediate image is reduced by a factor of four. The loop terminates when the image is reduced to one pixel or less.

More specifically, the process starts at block 80, where the bounding rectangle, created for a new object, is examined. If the bounding rectangle is NULL, which means that an image does not contain any "on" pixels, the procedure terminates. Otherwise, flow passes to block 81, where a pointer IM1 is set to the block of memory where the intermediate image (original image) is stored and a counter N is set to zero. The counter N provides the correspondence of the pixlist representations of a object and the slots of the object_array. Next, flow passes to test 82, where the system tests whether the loop is completed. If the image, that IM1 points to, has at least one pixel, the iterative process continues. Otherwise, the creation of the sequence of images is completed and this procedure terminates.

Next, flow passes to block 83 where another image is created by deleting alternate scan lines and alternate pixels of each scan line of the image pointed by IM1, and a pointer IM2 is set to the memory location of this new image. In the image pointed by IM2, a 2×2 square of pixels in the image pointed by IM1 is replaced by one pixel. Note that to increase efficiency, only the pixels within the bounding rectangle are examined. Next, at block 84, the image pointed by IM1 is compressed according to the previously described compression scheme, and it is stored such that a pointer of the Nth slot of the object_array points to the pixlist of this image. Thereafter, at block 85, the pointer IM1 is assigned the value of IM2, which means that the image pointed by IM2 is now treated as the original image, and the previous original image, which has been compressed and stored, is removed. At block 86, the counter N is incremented, so that the next image is stored at the location which address is stored in the next slot of the bitmap_array. Finally, flow returns to test 82.

6. Display

After objects have been created, deleted, moved, or scaled, or the displayed information has been panned or zoomed in or out, the information is displayed by copying the images representing visible objects onto an intermediate image and then copying this intermediate image to the screen. More specifically, the display operation consists of the steps shown in FIGS. 14–18.

Figure 14:
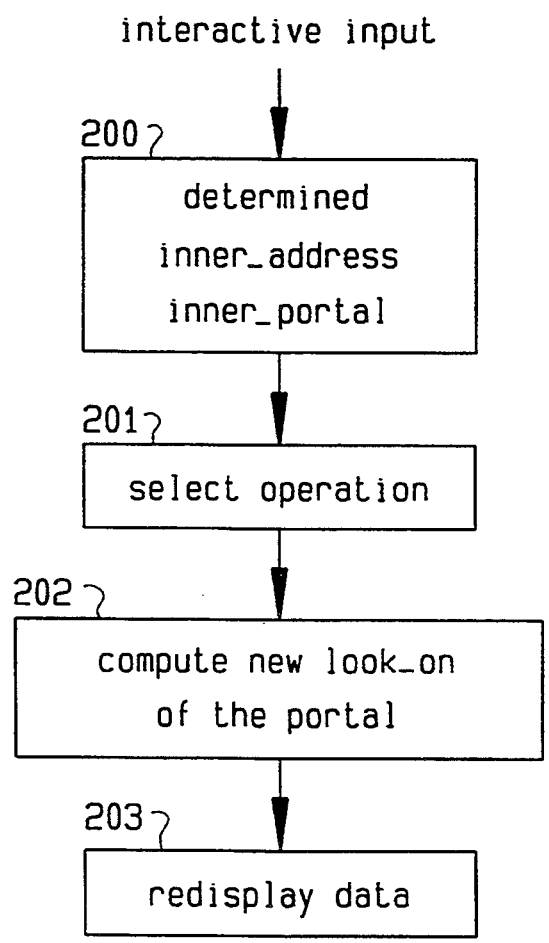
FIG. 14 is a flowchart illustrating the steps of a display change operation in response to an interactive input.

FIG. 14 depicts the high level steps of displaying data objects physically stored in the computer memory in response to a request to change the view shown on the display area. First, at block 200, in response to an interactive input by a user, such as a click of a mouse button, the system determines the innermost portal located at the cursor on the screen and the address of the cursor with respect to the look-on surface of the innermost portal. This is accomplished by invoking the procedure FIND_INNER_PORTAL_AND_ADDRESS described previously in conjunction with FIGS. 8–11. Next, at block 201, a user selects a display change operation, such as a zoom or a pan operation, using a conventional interactive technique for example, by selecting an appropriate item of a menu displayed on the screen. If the cursor is located only within the screen portal, everything shown on the screen would be magnified (or reduced) around the cursor appropriately or the information shown on the entire screen would be panned, depending on the selected operation. Otherwise, only the displayed information within the selected inner portal is magnified, reduced, or panned.

At block 202 the system computes a new look-on attribute of the address of the data object corresponding to the selected portal so that the displayed information would be changed according to the operation selected by the user. In order to zoom the information displayed in the portal about a fixed point (x,y) such that the change in magnification is z, the look-on attribute of the data object address is changed as follows:

$$\text{look\_on} = \text{OFFSET\_ADDR}([(1-1/z)x, (1-1/z)y, 1/z], \text{look\_on})$$

To perform a pan operation for the information displayed within a selected portal, the look_on is changed as follows:

$$\text{look\_on} = \text{OFFSET\_ADDR}(-\Delta x, -\Delta y, 1, \text{prev\_look\_on})$$

where $\Delta x$ and $\Delta y$ indicate the desired shift of the displayed data, and prev_look_on is the look-on attribute of the portal data object address before it has been changed for the pan operation.

Finally, at block 203 the system redisplays the data stored in the computer memory which is visible on the display area according to the procedure described in conjunction with FIG. 15. Since the look-on of the data portal object corresponding to the selected portal is changed appropriately, the display will change according to the user's input when the information is redisplayed as described below.

Figure 15A:
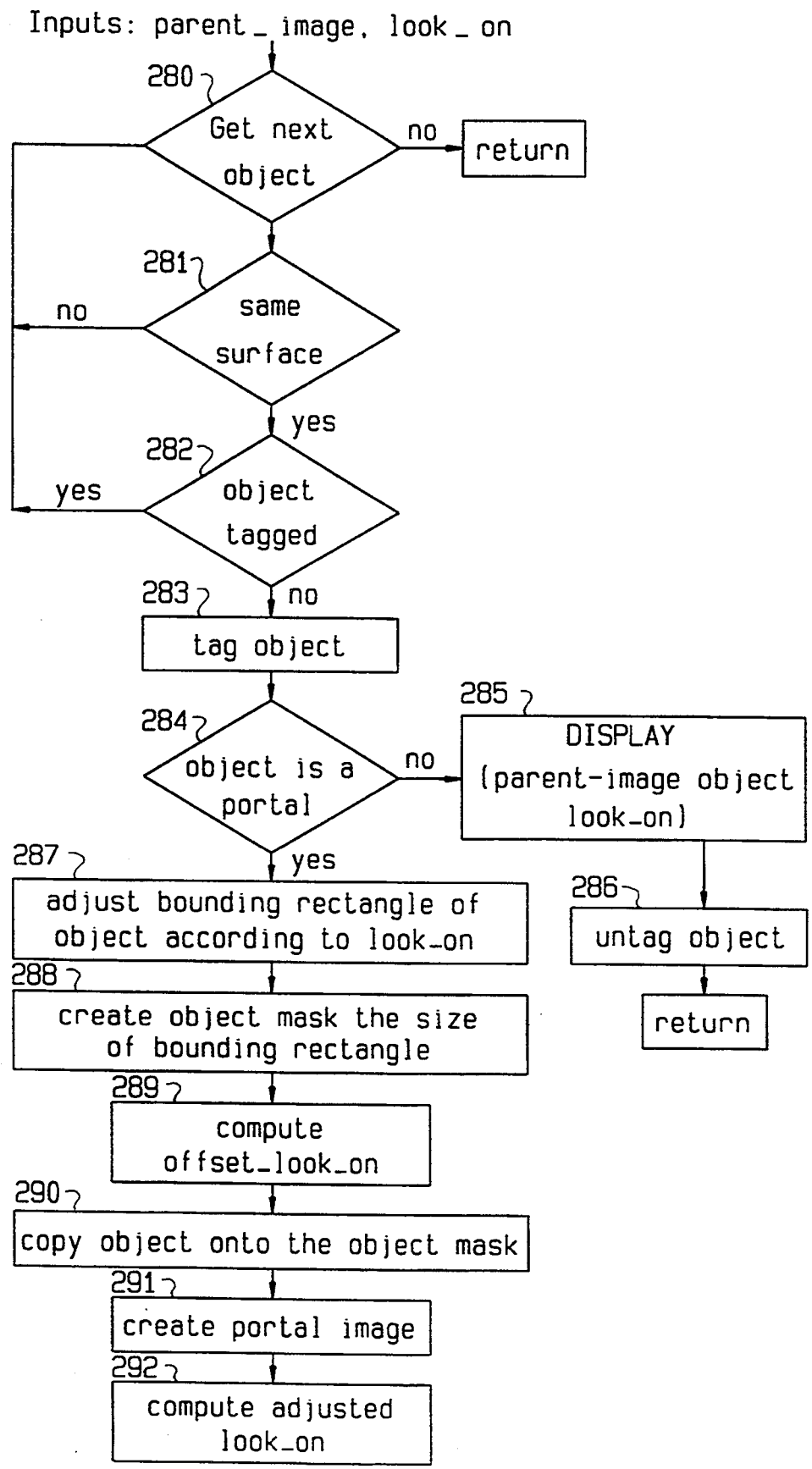
FIGS. 15(a) and 15(b) form a flowchart illustrating the steps of the display operation in further detail.

FIGS. 15(a) and (b) comprise a flowchart depicting the steps of displaying objects that are visible on the display area. This flowchart explains block 203 of FIG. 15 in greater detail. Note that at this point the system has already determined which data object corresponds to the innermost portal at the cursor and the coordinates of the cursor with respect to the surface that the innermost portal is looking onto have been determined.

Figure 15B:
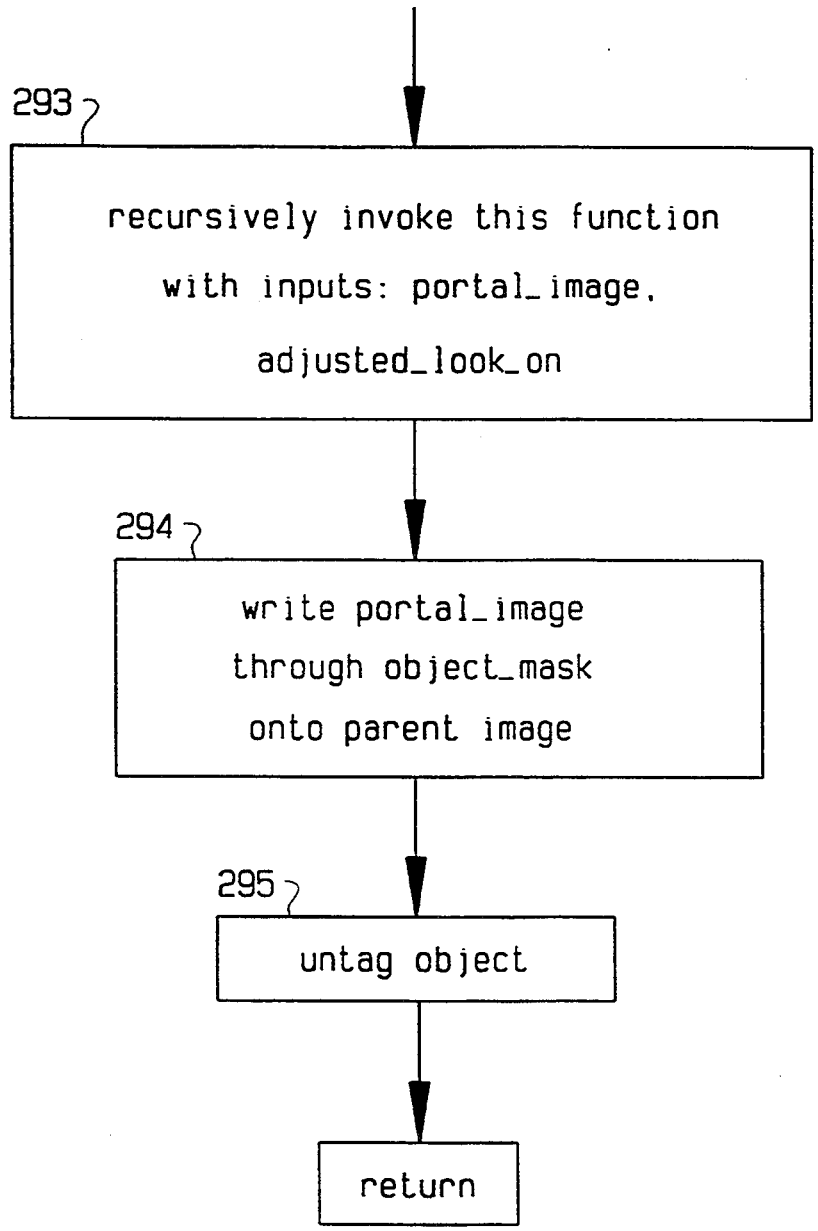

The procedure of FIGS. 15(a) and 15(b) is a recursive function, i.e., a function that invokes itself at least once. Such functions contain at least one terminating condition. Usually, a recursive function terminates after the terminating condition(s) are satisfied as many times as the function invoked itself. If the terminating condition is satisfied, the "return" instruction is executed and the execution of the function either returns to the previous level of recursion or the function terminates. Recursive techniques are discussed in various publications on computer technology. For example, see *Data Structures Using Pascal* by A. M. Tanenbaum and M. J. Augenstein, ch. 3 (Prentice-Hall, Inc.).

According to the procedure of FIGS. 15(a) and 15(b), first, the system allocates a block of memory for a blank intermediate image which has the same size (and resolution) as the display area. At subsequent invocations memory is allocated for the images that have the same size as inner portals to be displayed on the screen.

In this discussion, the reference is made to the parent and child portals. The parent portal is the portal that is looking onto the child portal. The "parent image" refers to the block of memory allocated for the parent portal and the "child image" refers to the block of memory allocated for the child portal.

In the procedure described in FIG. 15(a) and 15(b), for each child portal two intermediate images are created. The first one contains the shape of the portal and the second one contains all the information that is visible through the bounding rectangle of the portal. Then, the information of the second image, that is within the outline of the first image, is copied to the parent image.

The input to the procedure of FIGS. 15(a) and 15(b) is the pointer to the block of memory allocated for the parent image and the look-on of the parent portal data object (parent_image, look_on). During the first invocation of this procedure the pointer is to the allocated screen size intermediate image and the look_on is the look-on attribute of the screen portal.

The procedure begins at test 280 where the system begins sequentially examining the data objects stored in the linked list 20. Note that during the first iteration of this procedure, the first data object in the list 20 is selected as the next object. If all the stored data objects have been traversed, this procedure terminates. Otherwise, the flow passes to test 281 where the system checks whether the surface of the selected data object is the same as the surface specified in the input look_on. If the surface is different, the flow returns to test 280 where another data object is selected. Otherwise, the flow is transferred to test 282, where the system checks if the selected data object has been tagged. If so, the flow returns to test 280, where the new data object is selected. Otherwise, the flow is transferred to block 283 where the data object selected at 280 is tagged using any conventional technique, for example, by setting a designated bit in the object record.

Next, at test 284 the system checks whether the selected data object represents a portal by testing whether the look-on of the address of the data object is not NULL. If the data object does not represent a portal, at block 285, its graphical representation is copied onto the parent image passed to this procedure as an input parameter, using the DISPLAY procedure described subsequently in conjunction with FIG. 16. After object's graphical representation is copied to the appropriate image the flow is transferred to block 286 where the object is untagged. At this point, the function executes a return instruction, which means that either the execution of the function terminates or the execution returns to block 293, where the function has been invoked recursively.

If the data object is a data portal object, the flow is transferred from test 284 to block 287. Note that the selected object is referred to as child object (or child portal). At block 287, the system adjusts the coordinates of the bounding rectangle stored for the child object (i.e., the object determined in test 280), such that the bounding rectangle is scaled appropriately with respect to the look-on of the parent, which is passed as an input to this function. The adjusted coordinates of the bounding rectangle are referred to as [xlo, ylo, xhi, yhi]. This step is accomplished by first invoking the OFFSET_ADDR function, specified previously, in order to determine the absolute address of the bounding rectangle with respect to the surface of the child portal and then invoking REL_ADDRESS function in order to convert this absolute address to the relative address with respect to the parent object.

Next, at block 288, the system allocates memory for the first intermediate image stored for the child object. This image has the size of the bounding rectangle of the child object, as computed in block 287. This intermediate image is referred to as object_mask image. Then, at block 289, the system computes the offset_look_on address which is the look-on of the parent portal adjusted such that the shape of the child portal is copied at the proper location. This offset_look_on address is computed by invoking the OFFSET_ADDR function as follows:

offset_look_on=OFFSET_ADDR([xlo, ylo, 1], look_on)

Next, at block 290, the system copies the shape of the object onto the object_mask by invoking the DISPLAY function described subsequently with the following parameters: object_mask, object, offset_look_on. At this point, the system has created an intermediate image which contains the shape of the portal. This image will be utilized as a mask in order to copy only those objects that are within the shape of the child portal onto the parent's image. This is necessary in order to create portals of arbitrary shapes.

At block 291 the system creates yet another intermediate image, referred to as portal_image. The size of this image is that of the bounding rectangle of the child portal as determined at block 287. This image will contain all the information that is within the bounding rectangle. Subsequently this information will be merged with the object mask image in order to clip the information which is outside of the shape of the child portal. Next, at 292, the look-on of the child portal is adjusted by invoking OFFSET_ADDR twice as shown below.

adjusted_look_on=OFFSET_ADDR([0,0,parent.look_on.z/child.z], child look_on)

adjusted_look_on=OFFSET_ADDR([offset.x, offset.y, 1.0], adjusted_look_on)

Where offset.x and offset.y are the coordinates of the point (x=0,y=0) of the child object with respect to the parent object.

At block 293, this function is recursively invoked with the input parameters which are the portal_image (child image) created at block 291 and the adjusted_look_on address computed at block 292. Thus, for the next recursive invocation of this function, the portal image is the parent image, and the adjusted_look_on is the input look_on. After the function returns from the function call of block 293, the portal_image is copied onto the image of the parent through the mask_image, such that only the information of the portal image which is within the mask is copied onto the parent. The methods for such image masking are well known in the art. Finally, at block 295, the data object is untagged and the return instruction is executed so that this procedure terminates if all the information was copied onto the highest level intermediate image that corresponds to the entire screen, or the execution of this procedure returns to block 294.

Figure 16:
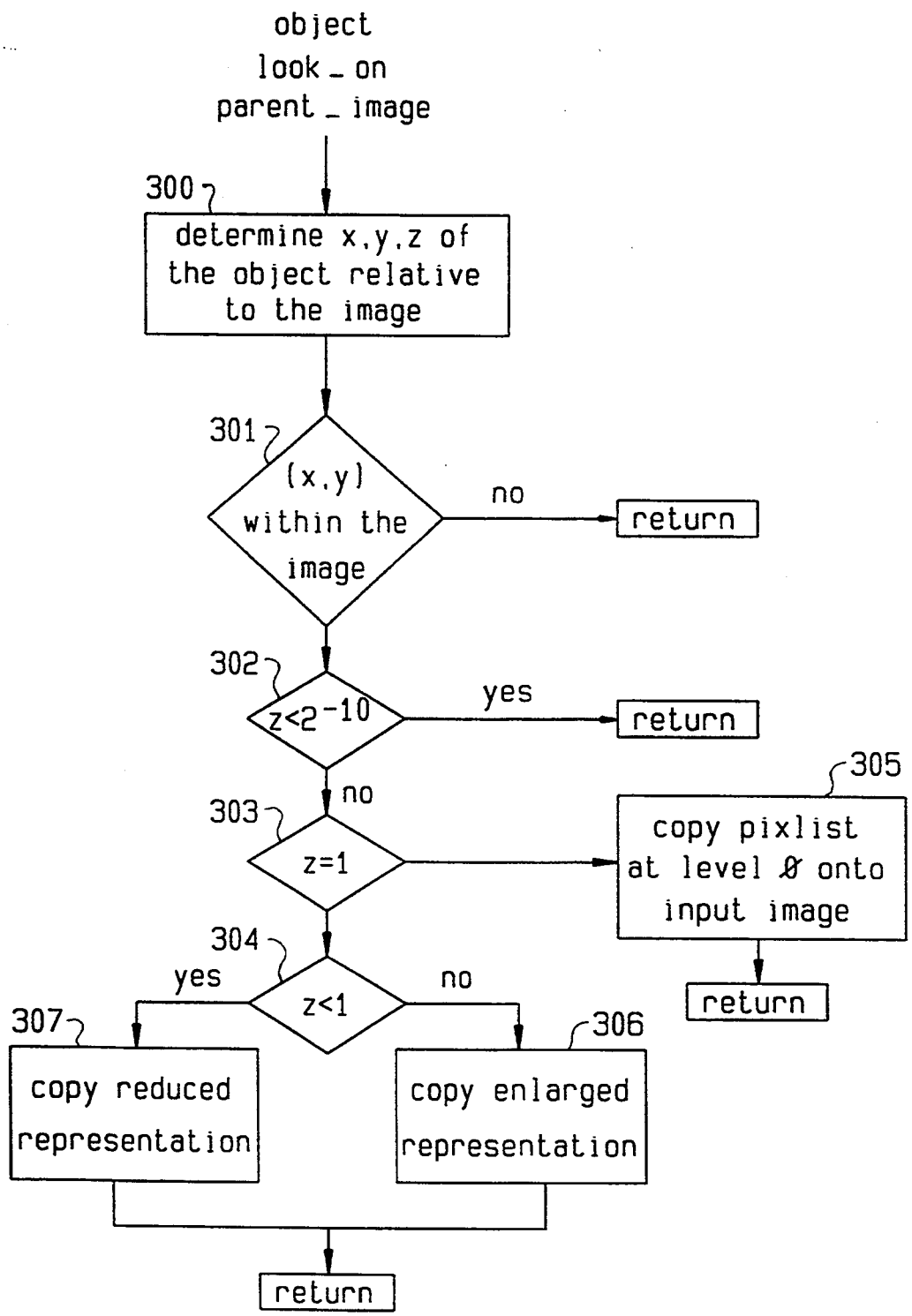
FIG. 16 is a flowchart illustrating the steps of copying a representation of an object to an intermediate images.

The steps of the DISPLAY function for copying individual objects into the parent image is depicted in FIG. 16. The inputs to this function are the data object that has to be displayed, the pointer to the parent image, and the look-on of the parent. First, at block 300, the system determines the relative [x, y, z] address of the object with respect to the parent image by invoking the REL_ADDRESS function with object address and parent look-on as parameters. Next, at test 301, the system checks whether the input object or a portion thereof is visible by comparing the x and y of the object's relative address to the coordinates of the bounding rectangle of the parent image. If the object is outside of the image this procedure terminates. At test 302, the system checks if the object is too small to be visible and if so, the function terminates without copying the graphical representation of this object onto the parent image. Otherwise, the appropriate pixlist is selected on the basis of the relative z coordinate determined in block 300. If the value of z is one (test 303), image representation of the object is copied to the output image at the original size. More specifically, object_array[0] is decompressed and copied to the parent image (block 305). Otherwise if z is less than 1 (test 304), the reduced representation of the object is generated and copied to the parent image (block 307), and if z is greater than one, the enlarged representation is generated and copied to the parent image (block 306).

At block 306, the representation of the object is copied to the parent image such that its size is greater than the size of the image that corresponds to the full-size representation of the object as created. Therefore, the pixlist pointed by the object_array[0] has to be decompressed and enlarged. This operation is performed as described below.

If the relative value of z determined in block 300 is greater than 16, the pixlist of the full-size representation of the object (object_array [0]) is decompressed and each "on" bit is copied to the parent image as n×n square of pixels, wherein n is the closest integer to the value of z. If $1.0 < z < 16.0$, the system enlarges the stored image as follows. Each scan line "y" of the original image (object_array[0]) is displayed a multiple number of times. More specifically, each scan-line y is displayed as scan-lines in the range of:

[floor (y×z), floor((y+1)×z)−1)]

Within each scan line (in x direction) the bytes of data that is copied to the parent image are generated as follows. The system contains a two-dimensional table stored in its memory which is indexed by the 256 possible values of eight-bit bytes in the first dimension and the 15 zoom factors in the second dimension. The table contains the bytes of data enlarged from 2 to 16 times. For example, if zoom factor z is 3, for each input byte there are three bytes saved in the table, in which each bit of the input byte is replicated three times. Thus, if z is an integer between 2 and 16, the enlargement of each byte within each scan line is accomplished by a single table look up. Namely, the values of the output bytes, that are copied to the parent image, are stored in the locations indexed by the value of z and the appropriate byte of the pixlist. If $n < z < n+1$, wherein n is an integer, and $1 < z \leq 16$, for each byte of the pixlist the system selects either n or n+1 as a second array index and, therefore, each input byte is mapped to either n or n+1 of the output bytes. The number of n and n+1 output byte strings is selected such that for k input bytes, kz bytes are written to the output scan line.

Figure 17:
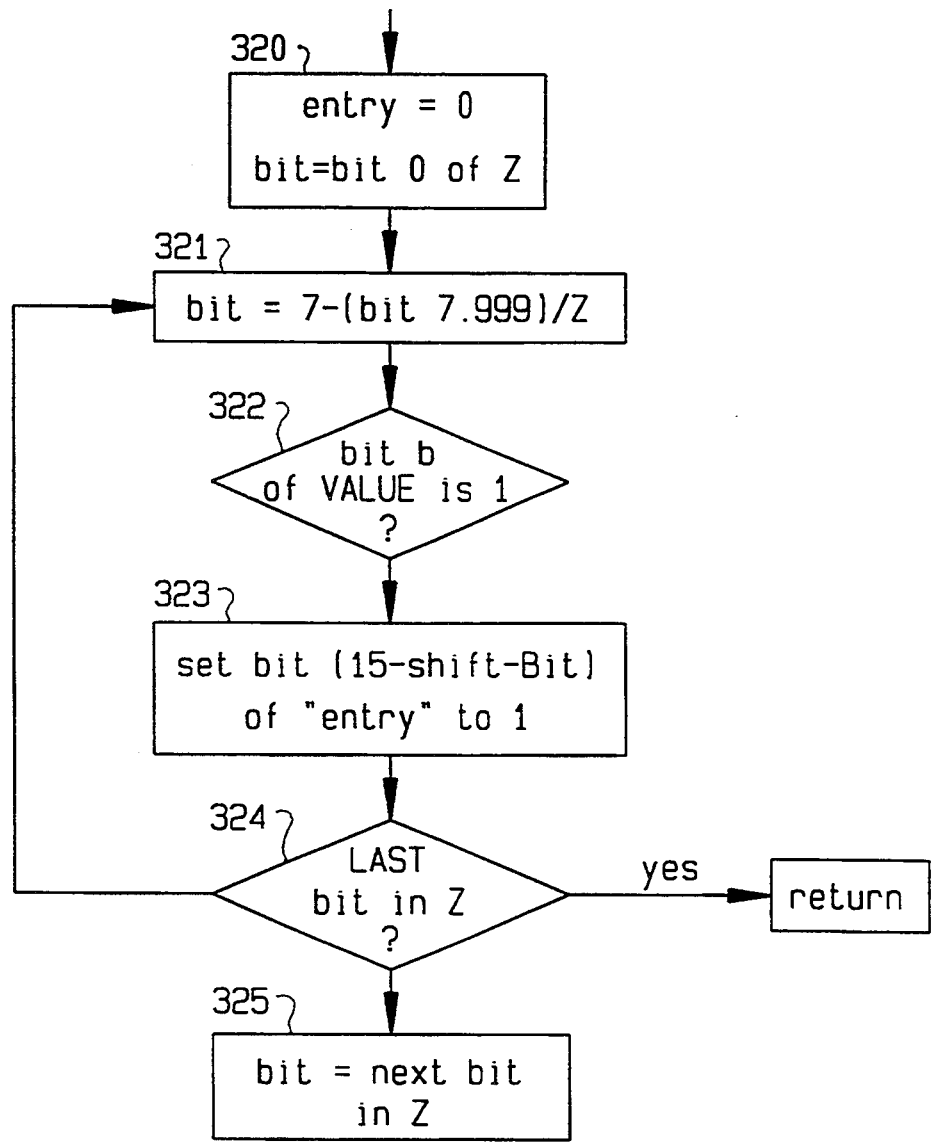
FIG. 17 is a flowchart illustrating the steps of creating an entry in a zoom_down table.

At block 307 of FIG. 17, the object is displayed smaller than its original size. Since the sequence of the reduced representations is provided in each data object, the first step in this procedure is to select the appropriate pixlist in the sequence of images. If the value of 1/z is a power of two, the log$_2$(1/z) pixlist is selected, decompressed and copied to the appropriate location of the parent image. Otherwise the pixlist [log$_2$(1/z)] is selected, i.e. the pixlist pointed by the object_array([-log$_2$(1/z)]). Since, in this case z is not a power of two, this pixlist has to be further reduced by a "zoom_down" factor, which is $1 \leq$ zoom_down $\leq 0.5$. The zoom_down factor is computed as follows zoom_down = $(2^{Log2(1/z)}/(2^{[Log2(1/x)]})$ In the vertical (y) direction, the reduction of the image is accomplished by periodically skipping scan lines of the decompressed pixlist. More specifically, the scan lines of the selected stored image which corresponds to the closest integer to (z/zoom_down) are copied to the parent image.

The procedure of reducing each scan line in horizontal (x) direction by the zoom_down factor is as follows. In order to improve efficiency, a precomputed 3 dimensional array (zoom_table) is stored in the computer memory. In the first dimension this array is indexed by the five values of the zoom_down factor, which are 4/8 5/8, 6/8, 7/8, 8/8 (the actual array indices are 4, 5, 6, 7, 8). In the second dimension the array is indexed by the horizontal bit shift values from 0 to 7. The precomputed bit shifts are useful for displaying the images after the pan operation. More specifically, after the pan operation, the byte boundaries of the panned image may not coincide with the byte boundaries of the refresh buffer. Thus, each two bytes of the image have to be combined before they are loaded into the refresh buffer. Finally, in the third dimension, the array is indexed by 256 values of the possible input bytes.

The contents of this table for each zoom_table [z] [shift] [value] location is computed as illustrated in FIG. 17. First, at block 320, the bit zero of the index z is assigned to the variable "bit" and the array entry that corresponds to a particular location of [z] [shift] [value] is assigned to zero. Next, at block 321, the variable "b" is computed as shown. At test 322, if the bit b of the index "value" is not one, the flow is transferred to test 324. Otherwise, at block 323 the value of the entry in the array is changed by setting the bit (15-shift-bit) of the entry to 1. At test 324, if the variable bit corresponds to the last bit in z, the value of the entry variable is assigned to the entry in the location [z] [shift] [value]. Otherwise, at block 325, the next bit of z is assigned to the variable bit and flow returns to block 321.

Figure 18:
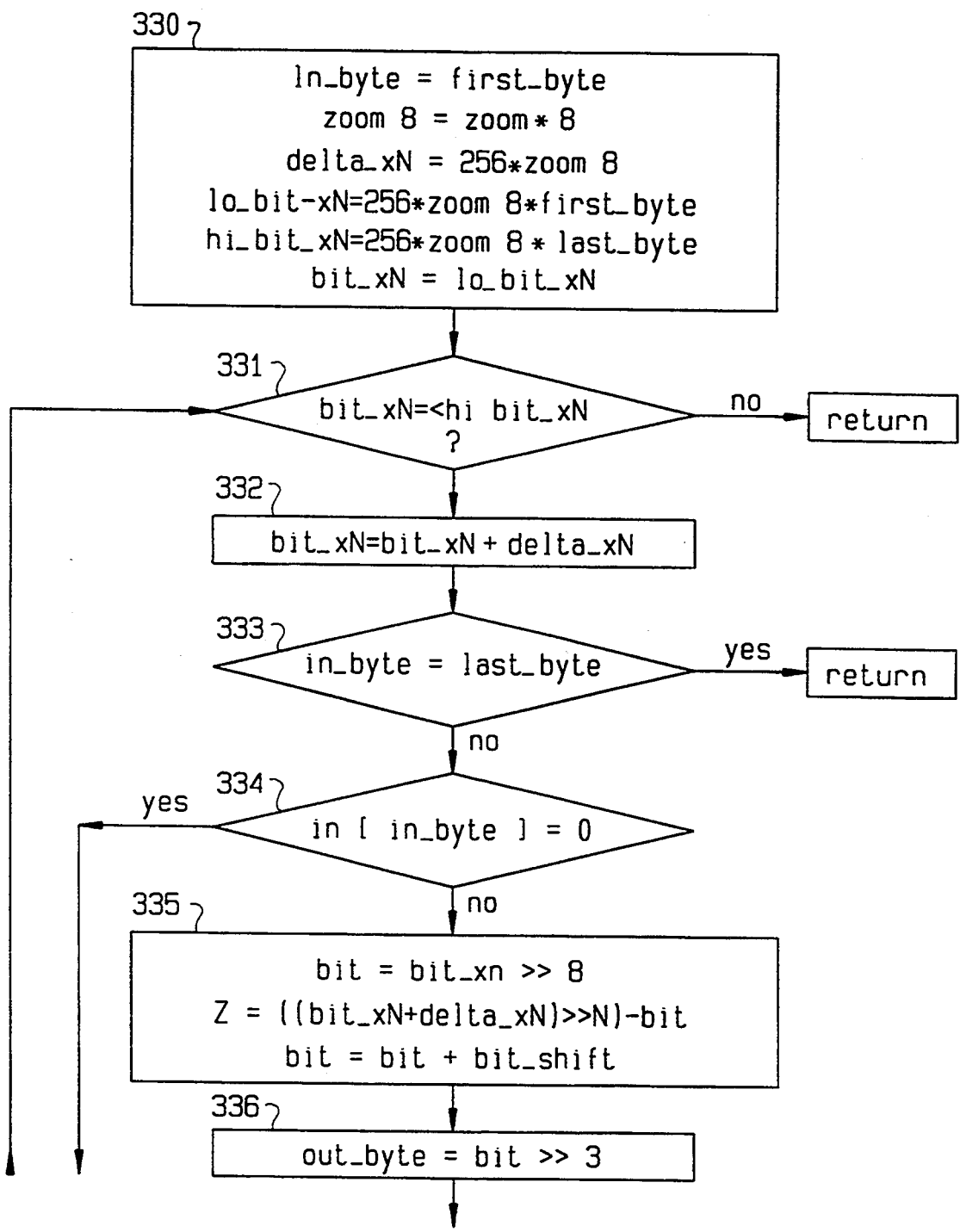
FIG. 18 is a flowchart illustrating the steps of a zoom down operation for a scan line.
Figure 18:
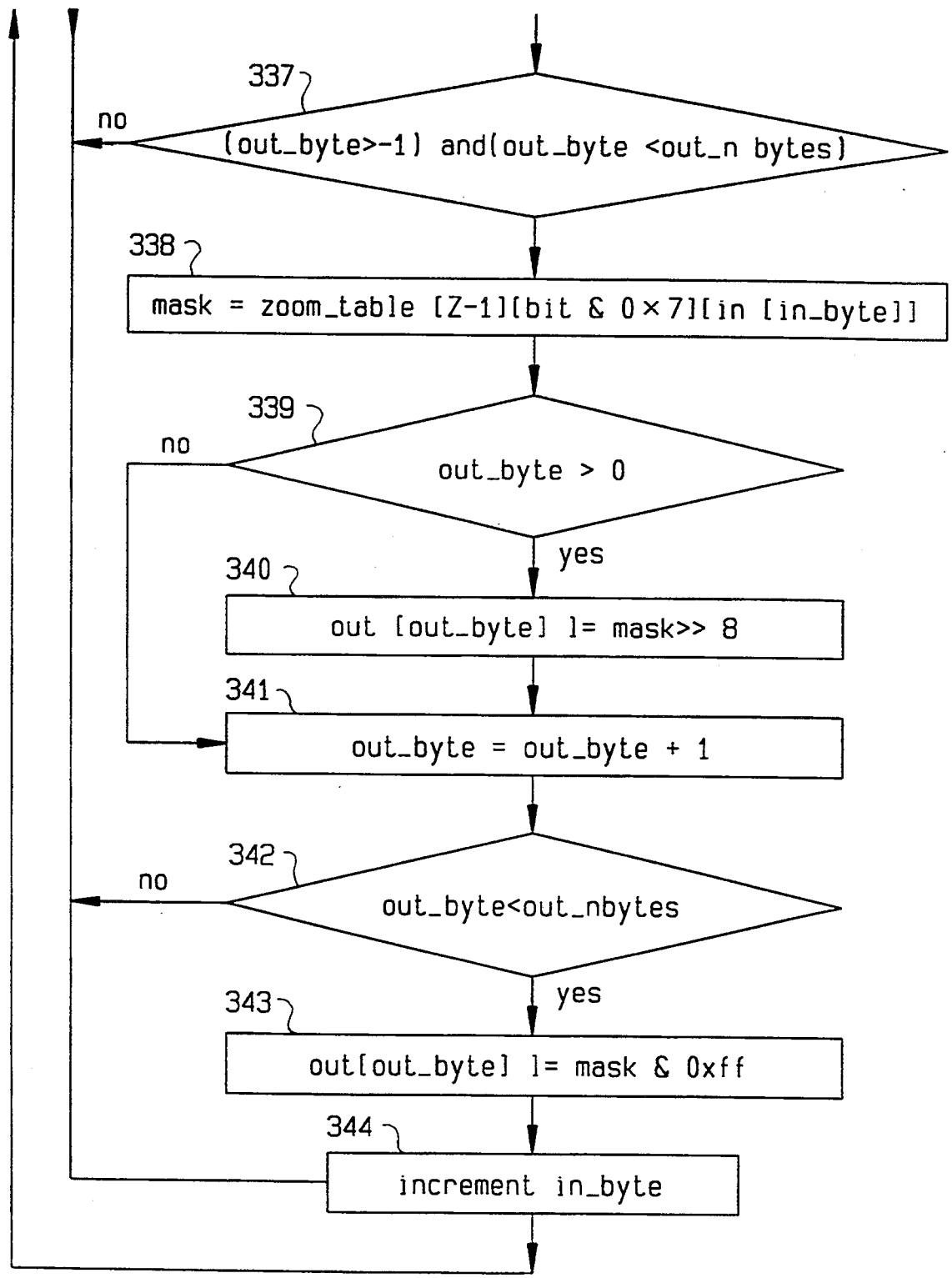

To display a scan line of a selected pixlist reduced by a zoom_down factor, each run of a scan line is changed according to the procedure illustrated in FIG. 18. Let us denote the location of the first byte of the run within a scan line as "first_byte" and the location of the last byte as "last_byte". The input to the procedure of FIG. 18 is an array which holds the bytes of a given run. This array is denoted as "in" array, i.e. this array is in[0. . . (last_byte−first_byte)]. Also, the inputs are a zoom_down factor, a horizontal bit shift, and the values of last_byte and first_byte. The output of this procedure is an array "out" which holds the input run reduced according to the zoom_down factor. More specifically this array is out[zoom_down*first-byte). . . (zoom_down*last_byte)].

In block 330 (FIG. 18), the system initializes the variables as shown. Note, that the variable "zoom" denotes the zoom_down factor, and the variables "first_byte" and "last_byte" are the first and last bytes of the run respectively. At test 331, if the value of bit _xN is greater or equal to hi_bit_xN, the input run have been processed and the procedure terminates. Otherwise, at block 332, the value of bit _xN is incremented by the value of delta_xN that was computed at block 330.

At test 333, if the value of the variable in_byte is the last byte of the input run, the reduced representation of the run has been computed and this procedure terminates. Otherwise, the flow is transferred to test 334. At test 334, if the value stored in the "in" array at "in_byte" position of the array is zero, the flow is transferred to block 334, where the value of in_byte is incremented by one. Otherwise, in block 335, the values of "z" and "bit" are computed as shown. Note that most of the notation herein is adapted from "C" computer language. Accordingly, a>>b means that the value of "a" is shifted "b" bits to the right; and the notation a 1 | =b means that a logical "or" operation is performed on the corresponding bits of "a" and "b", and the resultant value is assigned to "a". Also, note that the variable "bit_shift" is a horizontal bit shift of the output with respect to the byte boundary of the refresh buffer.

At block 336, the value of the variable "out_byte" is determined by shifting the value of the variable "bit" three places to the right. The value of out_byte designates the byte of the output array that is computed during a given iteration of the procedure of FIG. 18. Next, at test 337, if the computed value of out_byte is less than −1 or greater or equal than the total number of bytes in the output ("out") array of a particular run, the flow is transferred to block 344. Note that the total number of the output bytes is stored in the variable "out_nbytes".

At block 338, a variable "mask" is determined according to the entry in the zoom_table as shown. Next, if the value of out_byte is less than the total number of bytes in the output array (test 339), the entry of the "out" array, which corresponds to the out_byte, is computed as shown in block 340.

At block 341, the value of out_byte is incremented by one and, if the value of out_byte is less than the total number of bytes in the output array (test 342), the next byte of the "out" array is computed as shown in block 343. Finally, at block 344 the value of in_byte is incremented by one to point to the next byte of the input array and the flow returns to test 331.

There are various ways of integrating the fractal interface with applications. The capability of creating objects and portals, as well as zoom, pan, and other capabilities can be implemented as functions that are callable by applications. However, in this embodiment of the invention, the fractal interface is implemented as a process running in a multiprocessing environment, such that the fractal interface and any application utilizing the interface are asynchronous processes communicating by inter-process message passing mechanism provided by a particular computer system. The fractal interface receives and processes commands, such as "create a new object," "delete an object," "display refresh the screen," etc., and it also provides an interface to peripheral devices, such as a mouse. Since the fractal interface is implemented as an independent process, the fractal interface environment can be shared by applications running on different computer systems connected by a network.

The embodiments of the invention described above are presented for purposes of illustration and should not be construed as limiting the invention in any way. Doubtless, other embodiments may be conceived which would not depart from the spirit of the present invention, which scope is defined by the following claims.

What is claimed is:

1. A method of visually displaying, on a display area, items of information stored in computer memory, by displaying representation objects, which represent the items of information, on a reference surface, each of which representation objects has a predetermined size and position on such reference surface and is comprised of groups of pixels, comprising:

storing a data object, in the computer memory, for each of the representation objects having a predetermined size and position on such reference surface, each of which data objects comprises a sequence of image representations of such representation object, which sequence includes reduced copies of such representation object, and an address of such representation object on the reference surface;

deriving and storing a plurality of reduced copies of the representation objects by successively representing the information in the pixel groups forming such representation object by smaller pixel groups, so as to provide the sequence of image representations of successively smaller representation objects;

displaying at least a portion of the reference surface on such display area;

displaying a different portion of the reference surface in response to control signals to display different representation objects; and substituting representation objects of different size for displayed representation objects in order to effectively enlarge or reduce the magnification of the information displayed on the display area.

2. The method of claim 1 further comprising the step of providing at least one portal data object defining a portion of the reference surface and a portal scale at which the portion of the reference surface is to be displayed and for providing a portal representation object at a predetermined size, shape and position on the reference surface.

3. The method of claim 2 further comprising the step of displaying at least one portal representation object whereby the portion of the reference surface is displayed within the shape of such portal representation object on the display area.

4. The method of claim 3 wherein the step of displaying at least one portal representation object comprises:

allocating a block of memory for an intermediate image;

selecting a set of the data objects that correspond to the representation objects that are on the portion of the reference surface which will be displayed within a particular portal representation object;

determining images that represent each of the representation objects that will be displayed within the particular portal;

copying the images that represent the representation objects in the set into the block of memory allocated for the intermediate image; and displaying on the display area data stored in the block of memory allocated for the intermediate image.

5. The method of claim 4 wherein the step of determining the images comprises:

determining whether a particular representation object stored as the data object in the set is enlarged, reduced or unchanged and determining a scale of such enlargement or reduction; and if the particular representation object is magnified or unchanged, selecting a first image representation, which is not reduced, in the sequence of image representations stored for providing the particular representation object, otherwise selecting one of the subsequent images.

6. The method of claim 5 further comprising the step of deleting certain scan lines and certain bits of the selected image representation if the scale of the particular representation object is reduced by a factor which is not a power of two.

7. The method of claim 3 further comprising the step of compressing each image representation in the sequence stored for each data object such that bytes of imaging information, in which at least one bit does not have a zero value, are stored.

8. A method of visually displaying, on a display area, items of information stored in computer memory, by displaying representation objects, which represent the items of information, on a reference surface, each of which representation objects has a predetermined size and position on such reference surface and is comprised of groups of pixels, comprising:

storing a data object for each of the representation objects having a predetermined size, shape and position on such reference surface;

storing at least one portal data object defining a portion of the reference surface and a portal scale at which the portion of the reference surface is to be displayed and for providing a portal representation object at a predetermined size, shape and position on the reference surface;

displaying at least one portal representation object in the display area, whereby the portion of the reference surface defined by such portal data object is displayed in the display area; and varying at least one of (1) the portion of the reference surface displayed in such portal representation object in response to control signals to display different representation objects therein, and (2) the portal scale in response to control signals to display the representation objects at a different scale.

9. The method of claim 8 wherein the portal representation object corresponds to the entire display area.

10. The method of claim 8 wherein each of the data objects comprises a sequence of image representations of a corresponding representation object and an address of the corresponding representation object on the reference surface.

11. The method of claim 10 wherein the step of displaying at least one portal representation object comprises:

allocating a block of memory for an intermediate image;

selecting a set of the data objects that correspond to the representation objects that are on the portion of the reference surface which will be displayed within a particular portal representation object;

determining images that represent each of the representation objects that will be displayed within the particular portal;

copying the images of each of the representation objects in the set into the block of memory allocated for the intermediate image; and displaying on the display area data stored in the block of memory allocated for the intermediate image.

12. The method of claim 11 wherein the step of determining the images comprises:

determining whether a particular representation object is stored as the data object in the set is enlarged, reduced or unchanged and determining a scale of such enlargement or reduction; and if the particular representation object is magnified or unchanged, selecting a first image, which is not reduced, representation in the sequence of image representations stored for providing the particular representation object, otherwise selecting one of the subsequent image representations.

13. The method of claim 12 further comprising the step of deleting certain scan lines and certain bits of the selected image representation if the scale of the particular representation object is reduced by a factor which is not a power of two.

14. The method of claim 10 further comprising the step of compressing each image representation in the sequence stored for each data object such that bytes of imaging information, in which at least one bit does not have a zero value, are stored.

15. The method of claim 10 wherein the step of varying the portal scale comprises:

determining an innermost representation portal, which does not contain other portals within its shape;

storing image representation of the innermost portal in a first block of memory;

storing image representations of representation objects located within a bounding rectangle that confines the innermost portal in a second block of memory; and copying the second block of memory to a third block of memory such that only the image representations of the representation objects within the innermost portal are copied.

16. An apparatus for visually displaying items of information stored in computer memory, by displaying representation objects, which represent the items of information, on a reference surface, each of which representation objects has a predetermined size and position on such reference surface and is comprised of groups of pixels, comprising:

a computer having a display area;

means for storing a data object for each of the representation objects having a predetermined size and position on such reference surface, each of which data objects comprises a sequence of image representations of such representation object, which sequence includes reduced copies of such representation object, and an address of such representation object on the reference surface;

means for deriving and storing a plurality of reduced copies of representation objects by successively representing the information in the pixel groups forming such representation object by smaller pixel groups, so as to provide the sequence of image representations of successively smaller representation objects;

means for displaying at least a portion of the reference surface on such display area;

means for displaying a different portion of the reference surface in response to control signals to display different representation objects; and means for substituting representation objects of different size for displayed representation objects in order to effectively enlarge or reduce the magnification of the information displayed n the display area.

17. The apparatus of claim 16 further comprising
means for providing at least one portal data object defining a portion of the reference surface and a portal scale at which the portion of the reference surface is to be displayed and for providing a portal representation object at a predetermined size, shape and position on the reference surface.

18. The apparatus of claim 17 further comprising
means for displaying at least one portal representation object whereby the portion of the reference surface is displayed within the shape of such portal representation object on the display area.

19. The apparatus of claim 18 wherein the means for displaying at least one portal representation object comprises:

means for allocating a block of memory for an intermediate image;

means for selecting a set of the data objects that correspond to the representation objects that are on the portion of the reference surface which is displayed within a particular portal representation object;

means for determining images that represent each of the representation objects that will be displayed within the particular portal object;

means for copying the images that represent the representation objects in the set into the block of memory allocated for the intermediate image; and means for displaying on the display area data stored in the block of memory allocated for the intermediate image.

20. The apparatus of claim 19 wherein the means for determining the images comprises:

means for determining whether a particular representation object stored as the data object in the set is enlarged, reduced or unchanged and determining a scale of such enlargement or reduction; and means for selecting a first image, which is not reduced, representation in the sequence of image representations stored for providing the particular representation object if the particular representation object is magnified or unchanged; and means for selecting one of the subsequent image representations if the particular representation object is reduced.

21. The apparatus of claim 20 further comprising means for deleting certain scan lines and certain bits of the selected image representation if the scale of the particular representation object is reduced by a factor which is not a power of two.

22. The apparatus of claim 21 further comprising means for compressing each image representation in the sequence stored for each representation object such that bytes of imaging information, in which at least one bit does not have a zero value, are stored.

23. An apparatus for visually displaying items of information stored in computer memory, by displaying representation objects, which represent the items of information, on a reference surface, each of which representation objects has a predetermined size and position on such reference surface and is comprised of groups of pixels, comprising:

a computer having a display area;

means for storing a data object for each of the representation objects having a predetermined size, shape and position on such reference surface;

means for storing at least one portal data object defining a portion of the reference surface and a portal scale at which the portion of the reference surface is to be displayed and for providing a portal representation object at a predetermined size, shape and position on the reference surface;

means for displaying at least one portal representation object in the display area, whereby the portion of the reference surface defined by such portal data object is displayed in the display area; and means for varying at least one of (1) the portion of the reference surface displayed in such portal representation object in response to control signals to display different representation objects therein, and (2) the portal scale in response to control signals to display the representation objects at a different scale.

24. The apparatus of claim 23 wherein the portal representation object corresponds to the entire display area.

25. The apparatus of claim 23 wherein each of the data objects comprises a sequence of image representations of a corresponding representation object and an address of the corresponding representation object on the reference surface.

26. The apparatus of claim 25 wherein the means for displaying at least one portal representation object comprises:

means for allocating a block of memory for an intermediate image;

means for selecting a set of the data objects that correspond to the representation objects that are on the portion of the reference surface which will be displayed within a particular portal representation object;

means for determining images that represent each of the representation objects that will be displayed within the particular portal object;

means for copying the images of each of the representation objects in the set into the block of memory allocated for the intermediate image; and means for displaying on the display area data stored in the block of memory allocated for the intermediate image.

27. The apparatus of claim 26 wherein the means of determining the images comprises:

means for determining whether a particular representation object stored as the data object in the set is enlarged, reduced or unchanged and determining a scale of such enlargement or reduction;

means for selecting a first image, which is not reduced, representation in the sequence of image representations stored for providing the particular representation object if the particular representation object is magnified or unchanged; and means for selecting one of subsequent image representations if the particular representation object is reduced.

28. The apparatus of claim 27 further comprising means for deleting certain scan lines and certain bits of the selected image representation if the scale of the particular representation object is reduced by a factor which is not a power of two.

29. The apparatus of claim 28 further comprising means for compressing each image representation in the sequence stored for each representation object such that bytes of imaging information, in which at least one bit does not have a zero value, are stored.

30. The apparatus of claim 24 wherein means for varying the portal scale comprises:

means for determining an innermost representation portal, which does not contain other portals within its shape;

means for storing image representation of the innermost portal in a first block of memory;

means for storing image representations of representation objects located within a bounding rectangle that confines the innermost portal in a second block of memory; and means for copying the second block of memory to a third block of memory such that only the image representations of the representation objects within the innermost portal are copied.

* * * * *